(12) United States Patent
Zhang et al.

(10) Patent No.: US 12,148,119 B2
(45) Date of Patent: Nov. 19, 2024

(54) UTILIZING A GENERATIVE NEURAL NETWORK TO INTERACTIVELY CREATE AND MODIFY DIGITAL IMAGES BASED ON NATURAL LANGUAGE FEEDBACK

(71) Applicant: Adobe Inc., San Jose, CA (US)

(72) Inventors: Ruiyi Zhang, San Jose, CA (US); Yufan Zhou, Buffalo, NY (US); Christopher Tensmeyer, Columbia, MD (US); Jiuxiang Gu, College Park, MD (US); Tong Yu, San Jose, CA (US); Tong Sun, San Jose, CA (US)

(73) Assignee: Adobe Inc., San Jose, CA (US)

( * ) Notice: Subject to any disclaimer, the term of this patent is extended or adjusted under 35 U.S.C. 154(b) by 492 days.

(21) Appl. No.: 17/576,091

(22) Filed: Jan. 14, 2022

(65) Prior Publication Data

US 2023/0230198 A1 Jul. 20, 2023

(51) Int. Cl.
*G06T 5/00* (2024.01)
*G06N 3/04* (2023.01)
(Continued)

(52) U.S. Cl.
CPC ............... *G06T 3/10* (2024.01); *G06N 3/04* (2013.01); *G06T 11/00* (2013.01); *G10L 15/22* (2013.01);
(Continued)

(58) Field of Classification Search
None
See application file for complete search history.

(56) References Cited

U.S. PATENT DOCUMENTS

2018/0240257 A1* 8/2018 Li .................. G06V 10/774
2019/0392259 A1* 12/2019 Kajimoto ............. G06F 18/214
(Continued)

OTHER PUBLICATIONS

Cheng, Y.; Gan, Z.; Li, Y.; Liu, J.; and Gao, J. 2020. Sequential attention GAN for interactive image editing. In ACMMM.
(Continued)

*Primary Examiner* — Marcellus J Augustin
(74) *Attorney, Agent, or Firm* — Keller Preece PLLC

(57) ABSTRACT

The present disclosure relates to systems, non-transitory computer-readable media, and methods that implement a neural network framework for interactive multi-round image generation from natural language inputs. Specifically, the disclosed systems provide an intelligent framework (i.e., a text-based interactive image generation model) that facilitates a multi-round image generation and editing workflow that comports with arbitrary input text and synchronous interaction. In particular embodiments, the disclosed systems utilize natural language feedback for conditioning a generative neural network that performs text-to-image generation and text-guided image modification. For example, the disclosed systems utilize a trained model to inject textual features from natural language feedback into a unified joint embedding space for generating text-informed style vectors. In turn, the disclosed systems can generate an image with semantically meaningful features that map to the natural language feedback. Moreover, the disclosed systems can persist these semantically meaningful features throughout a refinement process and across generated images.

20 Claims, 12 Drawing Sheets

(51) Int. Cl.
*G06T 3/10* (2024.01)
*G06T 5/60* (2024.01)
*G06T 11/00* (2006.01)
*G06T 11/80* (2006.01)
*G10L 15/22* (2006.01)
*G10L 15/26* (2006.01)

(52) U.S. Cl.
CPC ........ *G10L 15/26* (2013.01); *G10L 2015/223* (2013.01)

(56) References Cited

U.S. PATENT DOCUMENTS

2020/0410730 A1* 12/2020 Wilensky ................ G06F 17/18
2022/0108417 A1* 4/2022 Liu ....................... G06T 1/0007

OTHER PUBLICATIONS

Ding, M.; Yang, Z.; Hong, W.; Zheng, W.; Zhou, C.; Yin, D.; Lin, J.; Zou, X.; Shao, Z.; Yang, H.; and Tang, J. 2021. CogView: Mastering Text-to-Image Generation via Transformers. arXiv:2105.13290.

El-Nouby, A.; Sharma, S.; Schulz, H.; Hjelm, D.; Asri, L. E.; Kahou, S. E.; Bengio, Y.; and Taylor, G. W. 2019. Tell, draw, and repeat: Generating and modifying images based on continual linguistic instruction. In ICCV.

Fu, T.-J.; Wang, X.; Grafton, S.; Eckstein, M.; and Wang, W. Y. 2020. Iterative language-based image editing via self-supervised counterfactual reasoning. In EMNLP.

Goodfellow, I.; Pouget-Abadie, J.; Mirza, M.; Xu, B.; Warde-Farley, D.; Ozair, S.; Courville, A.; and Bengio, Y. 2014. Generative adversarial nets. Advances in neural information processing systems, 27.

Heusel, M.; Ramsauer, H.; Unterthiner, T.; Nessler, B.; and Hochreiter, S. 2017. Gans trained by a two time-scale update rule converge to a local nash equilibrium. Advances in neural information processing systems, 30.

Karras, T.; Laine, S.; and Aila, T. 2019. A style-based generator architecture for generative adversarial networks. In Proceedings of the IEEE/CVF Conference on Computer Vision and Pattern Recognition, 4401-4410.

Karras, T.; Laine, S.; Aittala, M.; Hellsten, J.; Lehtinen, J.; and Aila, T. 2020. Analyzing and improving the image quality of stylegan. In Proceedings of the IEEE/CVF Conference on Computer Vision and Pattern Recognition, 8110-8119.

Li, B.; Qi, X.; Lukasiewicz, T.; and Torr, P. H. 2020. Manigan: Text-guided image manipulation. In Proceedings of the IEEE/CVF Conference on Computer Vision and Pattern Recognition, 7880-7889.

Lin, T.- H.; Bui, T.; Kim, D. S.; and Oh, J. 2018. A multimodal dialogue system for conversational image editing.

Lin, T.-Y.; Maire, M.; Belongie, S.; Hays, J.; Perona, P.; Ramanan, D.; Dollar, P.; and Zitnick, C.L. 2014. Microsoft coco: Common objects in context. In European conference on computer vision, 740-755. Springer.

Liu, Y.; Li, Q.; Sun, Z.; and Tan, T. 2020. Style Intervention: How to Achieve Spatial Disentanglement with Style-based Generators? arXiv:2011.09699. Part 1.

Liu, Y.; Li, Q.; Sun, Z.; and Tan, T. 2020. Style Intervention: How to Achieve Spatial Disentanglement with Style-based Generators? arXiv:2011.09699. Part 2.

Liu, Y.; Li, Q.; Sun, Z.; and Tan, T. 2020. Style Intervention: How to Achieve Spatial Disentanglement with Style-based Generators? arXiv:2011.09699. Part 3.

Patashnik, O.; Wu, Z.; Shechtman, E.; Cohen-Or, D.; and Lischinski, D. 2021. Styleclip: Text-driven manipulation of stylegan imagery. arXiv preprint arXiv:2103.17249. Part 1.

Patashnik, O.; Wu, Z.; Shechtman, E.; Cohen-Or, D.; and Lischinski, D. 2021. Styleclip: Text-driven manipulation of stylegan imagery. arXiv preprint arXiv:2103.17249. Part 2.

Radford, A.; Kim, J. W.; Hallacy, C.; Ramesh, A.; Goh, G.; Agarwal, S.; Sastry, G.; Askell, A.; Mishkin, P.; Clark, J.; et al. 2021. Learning transferable visual models from natural language supervision. arXiv preprint arXiv:2103.00020.

Ramesh, A.; Pavlov, M.; Goh, G.; Gray, S.; Voss, C.; Radford, A.; Chen, M.; and Sutskever, I. 2021. Zero-shot text- to-image generation. arXiv preprint arXiv:2102.12092.

Salimans, T.; Goodfellow, I.; Zaremba, W.; Cheung, V.; Radford, A.; and Chen, X. 2016. Improved techniques for training gans. Advances in neural information processing systems, 29: 2234-2242.

Van den Oord, A.; Vinyals, O.; and Kavukcuoglu, K. 2017. Neural discrete representation learning. In *Proceedings of the 31st International Conference on Neural Information Processing Systems*, 6309-6318.

Vaswani, A.; Shazeer, N.; Parmar, N.; Uszkoreit, J.; Jones, L.; Gomez, A. N.; Kaiser, Ł.; and Polosukhin, I. 2017. Attention is all you need. In NIPS.

Wu, Z.; Lischinski, D.; and Shechtman, E. 2021. Stylespace analysis: Disentangled controls for stylegan image generation. In Proceedings of the IEEE/CVF Conference on Computer Vision and Pattern Recognition, 12863-12872.

Xia, W.; Yang, Y.; Xue, J.-H.; and Wu, B. 2021. TediGAN: Text-Guided Diverse Face Image Generation and Manipulation. In IEEE Conference on Computer Vision and Pattern Recognition (CVPR).

Xu, T.; Zhang, P.; Huang, Q.; Zhang, H.; Gan, Z.; Huang, X.; and He, X. 2018. Attngan: Fine-grained text to image generation with attentional generative adversarial networks. In Proceedings of the IEEE conference on computer vision and pattern recognition, 1316-1324.

Yu, A.; and Grauman, K. 2014. Fine-Grained Visual Comparisons with Local Learning. In Computer Vision and Pattern Recognition (CVPR).

Zhang, H.; Koh, J. Y.; Baldridge, J.; Lee, H.; and Yang, Y. 2021. Cross-Modal Contrastive Learning for Text-to-Image Generation. arXiv:2101.04702. Part 1.

Zhang, H.; Koh, J. Y.; Baldridge, J.; Lee, H.; and Yang, Y. 2021. Cross-Modal Contrastive Learning for Text-to-Image Generation. arXiv:2101.04702. Part 2.

Zhang, R.; Isola, P.; Efros, A. A.; Shechtman, E.; and Wang, O. 2018. The unreasonable effectiveness of deep features as a perceptual metric. In Proceedings of the IEEE conference on computer vision and pattern recognition, 586-595.

Zhu, M.; Pan, P.; Chen, W.; and Yang, Y. 2019. Dm-gan: Dynamic memory generative adversarial networks for text-to-image synthesis. In Proceedings of the IEEE/CVF Conference on Computer Vision and Pattern Recognition, 5802-5810.

* cited by examiner

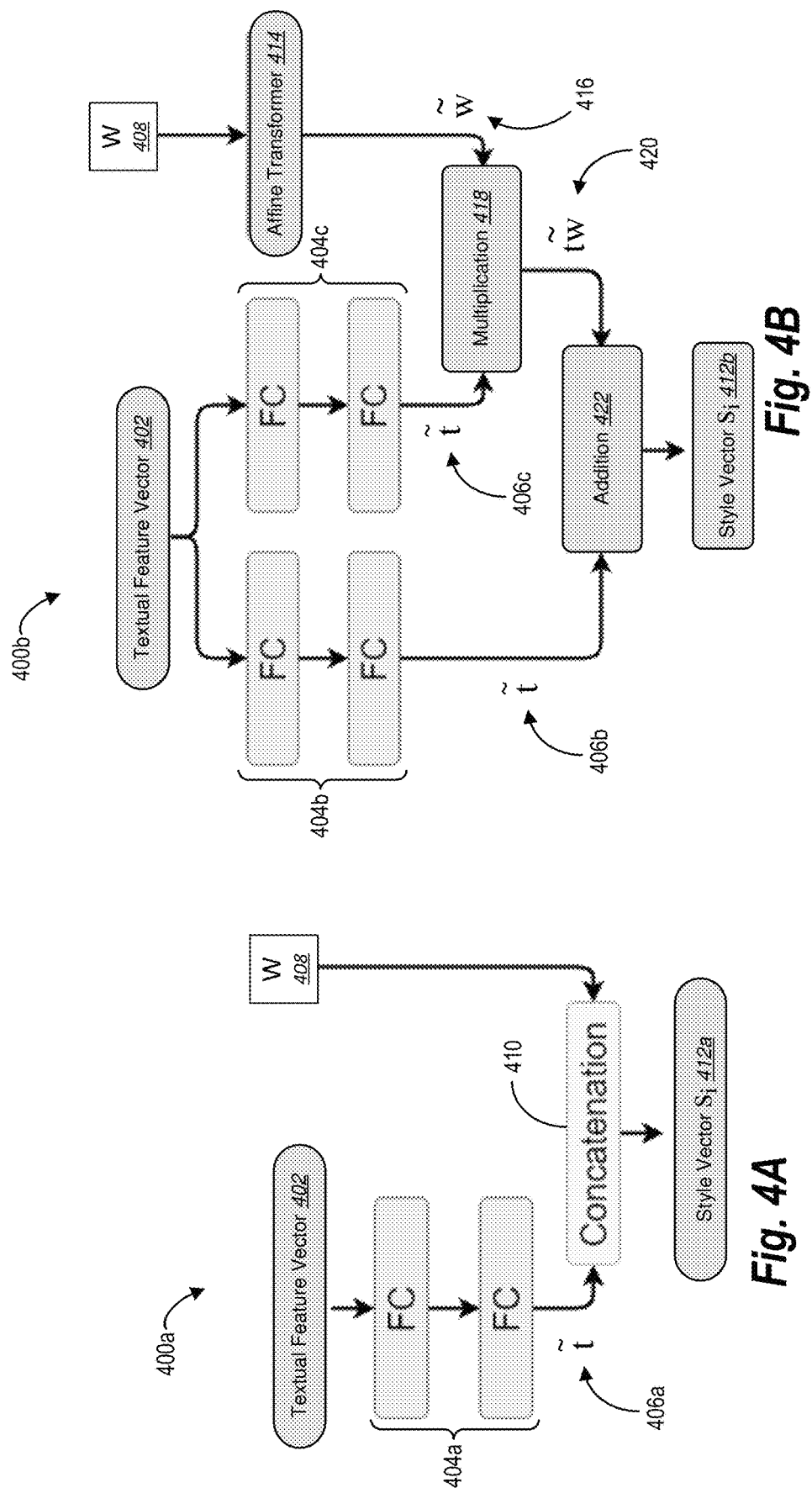

UTILIZING A GENERATIVE NEURAL NETWORK TO INTERACTIVELY CREATE AND MODIFY DIGITAL IMAGES BASED ON NATURAL LANGUAGE FEEDBACK

BACKGROUND

Recent years have seen significant advancement in hardware and software platforms for generating and editing digital images. For example, conventional systems can create digital images, modify digital images, intelligently select objects in digital images, crop digital images, and/or replace objects or features in digital images. With these advancements, however, conventional image systems have also developed a number of technical deficiencies. Indeed, as conventional systems have increased in complexity, they have also experienced a corresponding reduction in accessibility and efficiency. For instance, conventional systems can include a vast array of inefficient editing options, algorithms, and user interfaces that increase the time and resources required of computing systems.

Accordingly, some conventional image systems have adopted virtual design models/assistants that use high-level image editing commands (spoken or text) to create or interact with digital images. However, these natural language approaches also suffer from a variety of drawbacks. For example, conventional image systems often generate inaccurate digital images based on natural language feedback. Specifically, conventional image systems inconsistently and inaccurately interpret natural language feedback (particularly complex natural language feedback with multiple word elements). Indeed, because natural language models are often imprecise, conventional image systems typically generate images (e.g., two-dimensional arrays of pixels) that do not accurately reflect the intended purpose of the natural language feedback.

In addition, conventional image systems have limited system flexibility. For example, some conventional image systems focus exclusively on single-round tasks (i.e., generating or manipulating an image only in the context of a single natural language instruction). Such a restriction limits the applicability of these conventional image systems, particularly for real use cases where a user may want to continually refine an image. Although capable of naïve recursive application, these conventional image systems do not persist previous edits.

Also limiting system flexibility, certain conventional image systems often only process a limited set of predefined inputs. For example, some conventional image systems are trained on predefined sequences of natural language instructions and/or a predetermined order for processing natural language instructions. Accordingly, conventional image systems are often unable to accommodate fully interactive, real-world natural language commands that occur outside of the predefined responses.

Furthermore, conventional image systems that have adopted natural language processing contribute to additional inefficiencies. Indeed, conventional image systems often utilize inefficient natural language processing algorithms that require significant computational overhead to implement. For example, conventional image systems require significant time and user interactions to generate and modify digital images. Accordingly, in multiplying the time, user interactions, and interface elements conventional systems also increase the computing resources (e.g., memory and processing power) needed to manipulate digital images.

BRIEF SUMMARY

Embodiments of the present disclosure provide benefits and/or solve one or more of the foregoing or other problems in the art with systems, non-transitory computer-readable media, and methods that implement a deep learning framework for interactive, multi-round image generation utilizing natural-language feedback. Specifically, the disclosed systems provide an intelligent framework (i.e., a text-based interactive image generation model—TiGAN) that facilitates a multi-round image generation and editing workflow that comports with arbitrary input text and synchronous interaction with users. In particular embodiments, the disclosed systems utilize natural language feedback for conditioning a generative neural network that intelligently performs text-to-image generation and text-guided image modification. For example, the disclosed systems utilize a contrastive language image pre-training (CLIP) model to inject textual features from complex natural language feedback into a unified joint embedding space (e.g., a modified StyleGAN2 vector space) for generating text-informed style vectors. In turn, the disclosed systems can generate an image with semantically meaningful features that map to the natural language feedback. Moreover, the disclosed systems can persist these semantically meaningful features throughout a refinement process and across subsequently generated images.

Additionally, the disclosed systems utilize novel contrastive losses for efficiently training a generative neural network and a discriminator neural network. In particular embodiments, the generative neural network uses the contrastive losses to generate digital images with higher semantic similarity to the provided natural language feedback and lower semantic similarity to textual descriptions of other images. Similarly, the discriminator neural network uses the contrastive losses to extract more semantically meaningful features aligned with the provided natural language feedback.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

FIGS. 4A-4B illustrate an interactive image generation system generating style vectors using a style generator in accordance with one or more embodiments.

DETAILED DESCRIPTION

Figure 1:
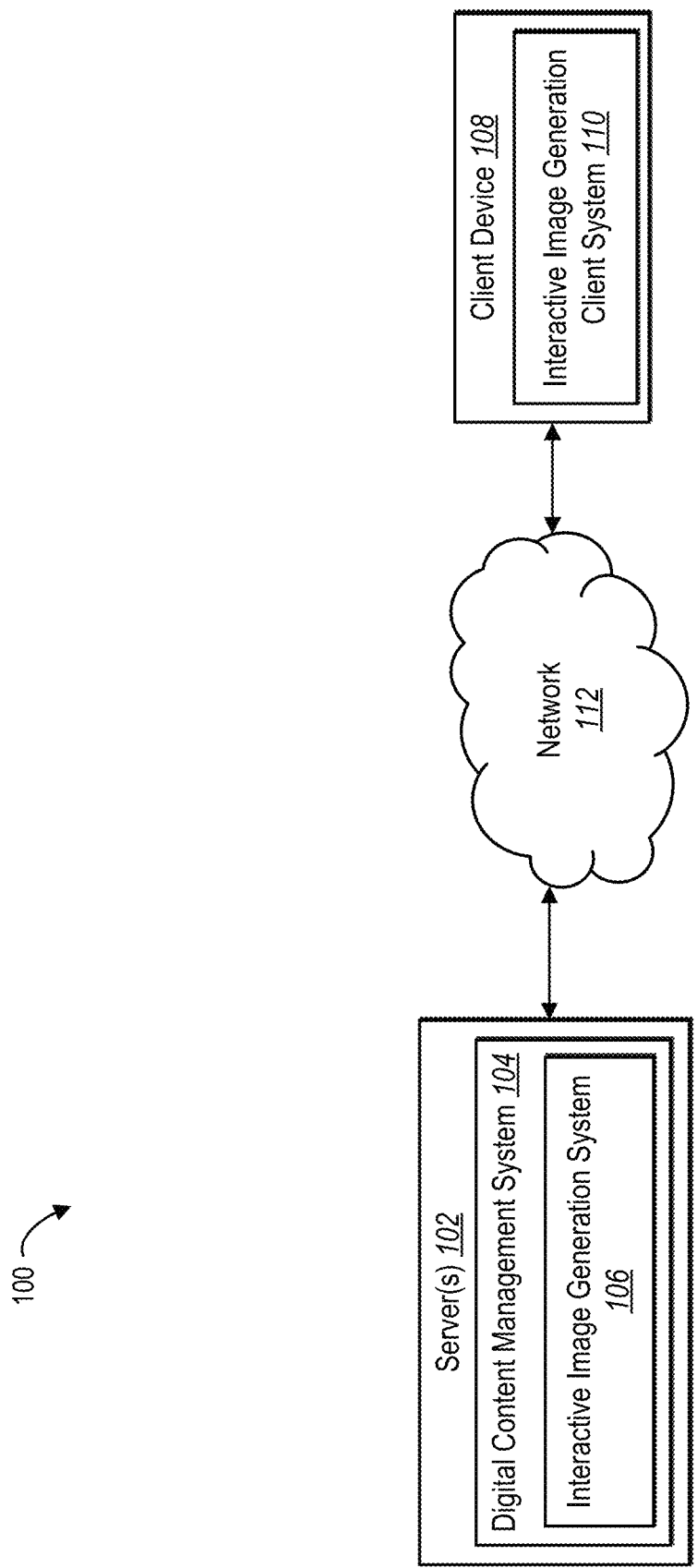
FIG. 1 illustrates a computing system environment for implementing an interactive image generation system in accordance with one or more embodiments.

One or more embodiments described herein include an interactive image generation system that can train and utilize powerful unconditional generative neural networks for text-conditional image generation. For example, the interactive image generation system can generate and modify an image according to natural language feedback and without undesirable visible changes. To illustrate, after generating an image in a text-to-image interaction, the interactive image generation system can identify additional text feedback. In response to the additional text feedback, the interactive image generation system can selectively update the intermediate features of a generative neural network that are relevant to the additional text feedback—thereby maintaining image consistency in subsequent interactions. Then, the interactive image generation system can update a graphical user interface of a client device to portray the generated or modified digital image for further user feedback. This process can be iterative (e.g., until a user is satisfied with the resultant digital image).

To illustrate, in one or more embodiments, the interactive image generation system uses a TiGAN model that utilizes a generative neural network and an encoding model to achieve an improved text-to-image mapping with disentangled, semantically meaningful features. For example, based on arbitrary text description (e.g., a natural language command), a text encoder (e.g., a CLIP model) generates a textual feature vector for injecting into the disentangled style space of the generative neural network (e.g., a StyleGan2 model). To do so, the interactive image generation system utilizes one or more new style transformation generators with neural network layers that intelligently generate a text-informed style vector. This text-informed style vector combines a latent noise vector from Gaussian noise and the textual feature vector from the CLIP encoder. In turn, the interactive image generation system implements a synthesis network (e.g., a generative neural network) to generate an image that matches the arbitrary text based on the text-informed style vector.

In addition to text-to-image generation, the interactive image generation system utilizes the TiGAN model for text-guided, interactive image manipulation. For example, the text encoder generates an additional textual feature vector that corresponds to an additional textual description of one or more targeted image modifications to be applied to the previously generated image. From the additional textual feature vector, the style transformation generators generate a modified style vector that updates one or more relevant dimensions of the previously generated style vector. For example, the interactive image generation system generates the modified style vector by changing a subset of the dimensions of the previous style vector that satisfy a threshold semantic feature change in view of the additional textual feature vector. The interactive image generation system then uses the synthesis network to generate a modified digital image having the targeted image modifications based on the modified style vector. In this manner, the interactive image generation system can manipulate target attributes of an image while preserving previous interactions in a user session and mitigating (or avoiding) undesirable image changes. Accordingly, the interactive image generation system can also improve a processing efficiency (e.g., by persisting edits throughout a user session to reduce a number of user interactions to process).

In one or more embodiments, the interactive image generation system implements contrastive learning to train the TiGAN model. For example, at training, the interactive image generation system implements novel contrastive losses in addition to generative and discriminator losses. To illustrate, the interactive image generation system determines a contrastive generative loss and a contrastive discriminator loss for a generative neural network. The contrastive generative loss encourages the generative neural network to generate images with high semantic similarity to text feedback and low semantic similarity with descriptions of other images. In addition, a discriminator neural network and the generative neural network use the contrastive discriminator loss, which encourages the discriminator neural network to extract semantically meaningful features aligned with the text feedback.

As briefly mentioned above, a number of problems exist with conventional image systems. The interactive image generation system can address many of these technical drawbacks. For example, the interactive image generation system can improve image accuracy and system flexibility relative to conventional image systems. In particular, the interactive image generation system can generate images that accurately reflect a textual input (e.g., textual input reflecting a natural language command originating from vocal interactions, typing, or other user interactions) by utilizing a pre-trained text encoder to generate a textual feature vector. In turn, the interactive image generation system uses the textual feature vector to generate a text-informed style vector. The interactive image generation system then implements a generative neural network to generate a digital image that matches the textual input based on the text-informed style vector. Thus, the interactive image generation system implements text-conditional image generation to accurately reflect textual inputs in a generated image.

In addition to improved accuracy, the interactive image generation system can also improve system flexibility. For example, unlike some conventional image systems, the interactive image generation system can perform multi-round image generation while persisting edits throughout the image generation rounds. To do so, the interactive image generation system selectively determines elements of a previous style vector to update based on the additional textual feedback. To illustrate, the interactive image generation system determines a similarity between a semantic feature change for each style element of the previous style vector and a desired semantic change based on the additional textual feedback. From a modified style vector with the updated style elements, a generative neural network can flexibly generate modified images that reflect iterative feedback plus prior feedback.

Further, the interactive image generation system can also improve system flexibility by processing arbitrary natural language commands (whether spoken or text). For example, unlike some conventional image systems that process only pre-defined inputs, the interactive image generation system can process a wide variety of different, arbitrary natural language commands. To do so, the interactive image generation system implements a trained text encoder (e.g., a CLIP text encoder) that generates a textual feature vector based on an arbitrary natural language command indicating targeted image elements or modifications. The interactive image generation system then integrates the textual feature vector into a style vector for generating images that capture the targeted image elements or modifications. Accordingly, the interactive image generation system can flexibly integrate a text encoder built on a rich domain of text-image pairs to increase system flexibility for arbitrary natural language commands.

Moreover, the interactive image generation system can provide these improvements to system flexibility and accuracy while also improving overall system efficiency. For instance, the interactive image generation system can significantly reduce the time and number of user interactions needed to generate and modify digital images. For example, a client device implementing the image generation system can create a digital image with specific desired features (e.g., a dog with black hair and spots) with a single natural language command. Moreover, the client device can modify the digital image (e.g., to portray a large dog with black hair and spots) with an additional natural language command. This can significantly improve the efficiency of user interfaces and user interactions with digital image editing applications.

In addition, the interactive image generation system can also utilize efficient algorithms and architectures. As established in greater detail below, implementing computing devices of the interactive image generation system 106 can use fewer computer resources and improve runtime speeds for generating a digital image (e.g., at implementation and/or at training) relative to conventional systems.

As illustrated by the foregoing discussion, the present disclosure utilizes a variety of terms to describe features and benefits of the interactive image generation system. Additional detail is now provided regarding the meaning of these terms. For example, as used herein, the term "natural language command" refers to an audio-based or textual-based natural language input. In particular embodiments, a natural language command includes an arbitrary voice request (e.g., an audio cue). Alternatively, a natural language command includes textual input (e.g., text-based communications, typed or transcribed responses, alphanumeric selections, etc.). Relatedly, the term "arbitrary" in the context of a natural language command refers to feedback that is unconstrained or not limited to a set of predetermined selections.

As used herein, the term "targeted image element" refers to requested, desired, or solicited subject matter or features for portrayal in a generated digital image. In particular embodiments, a targeted image element includes an object, object attribute (e.g., color, shape, or size), or environment of a generated digital image. For example, targeted image elements may include a face (or a man's face), a train (or a green train or a green train coming down a track), a bus (or a yellow bus or a yellow bus in a forest), etc. Similarly, the term "targeted image modification" refers to a requested, desired, or solicited change to a portion of a generated digital image. For example, a targeted image modification can include changing object attributes (e.g., color or size), adding objects (e.g., hat or sunglasses to a character), removing objects, repositioning objects, changing foreground or background matter, etc. To illustrate, a client device can first request a targeted image element of a train. The client device can then request a targeted image modification of a "green" train (e.g., a modification of the train to a particular color).

Additionally, as used herein, the term "text encoder" refers to a computer-implemented algorithm or model for generating a vector representation of one or more words. In particular embodiments, a text encoder includes a trained model with one or more neural network layers for generating a textual feature vector (e.g., a feature embedding representing one or more features extracted from a natural language command). In certain implementations, a text encoder includes the text encoder of a contrastive language image pre-training (CLIP) model as described by Radford et al., *Learning Transferable Visual Models From Natural Language Supervision*, In Computer Vision and Pattern Recognition (February 2021), archived at arxiv.org/pdf/2103.00020.pdf, (hereafter "Radford et al.") the contents of which are expressly incorporated herein by reference. The interactive image generation system can utilize a variety of text encoders.

As used herein, the term "style transformation generator" refers to a computer-implemented algorithm or model for generating a style vector. In particular embodiments, a style transformation generator includes neural network layers that combine a latent noise vector (e.g., a vector representation of a Gaussian distribution noise sampling) and a textual feature vector to generate a style vector. To illustrate, a style transformation generator comprises neural network layers (e.g., fully-connected layers, attention layers, or other neural network layers) and one or more transforming elements for combining and/or modifying vectors to generate a style vector. In one or more embodiments, a style transformation generator generates a modified style vector by determining a set of style elements (e.g., vector elements or values) of one or more previous style vectors in a user session (e.g., work session, time session, project session, interactive session, etc.) to update based on an additional textual feature vector.

As used herein, the term "neural network" refers to a model that can be tuned (e.g., trained) based on inputs to approximate unknown functions. In particular, a neural network includes interconnected neurons arranged in layers that communicate and learn to approximate complex functions and generate outputs based on a plurality of inputs provided to the model. These layers can include a variety of parameters (e.g., layer weights that emphasize or de-emphasize features) that change during the learning process to improve neural network outputs and predictions. The term machine-learning model includes deep convolutional neural networks ("CNNs"), fully convolutional neural networks ("FCNs"), or recurrent neural networks ("RNNs") such as long short-term memory neural networks ("LSTMs"). In other words, a neural network is an algorithm that implements deep learning techniques or machine learning that utilizes a set of algorithms to attempt to model high-level abstractions in data.

In particular embodiments, the interactive image generation system utilizes a generative neural network (e.g., a generative adversarial neural network). For example, a generative neural network includes a style-based GAN architecture (e.g., StyleGAN or PoseGan model architecture). In certain implementations, a generative neural network includes a style-based GAN architecture with components from the StyleGan2 model architecture (e.g., as described by Karras et al., *Analyzing And Improving The Image Quality Of StyleGan*, In Proceedings of the IEEE/CVF Conference on Computer Vision and Pattern Recognition (CVPR), 2020, pp. 8110-8119, (hereafter, "Karras"), the contents of which are expressly incorporated herein by reference). The interactive image generation system can utilize a variety of generative neural networks. Further, in some embodiments, the interactive image generation system utilizes a discriminator neural network. For instance a discriminator neural network can include a classifier with one or more neural network layers for generating an authenticity prediction (i.e., a prediction of whether a generated image is real or fake).

Additionally, as used herein, the term "contrastive loss" refers to a quantitative value for measure of loss (from a loss function) that compares/contrasts image and/or text pairs (e.g., to learn one or more parameters for a neural network). In particular embodiments, a contrastive loss includes one or more similarity terms that value a similarity between an image-text pair. For example, a contrastive loss includes a cosine similarity between image feature vectors of generated images and textual feature vectors of corresponding image-text descriptions. As another example, a contrastive loss includes a cosine similarity between image feature vectors of generated images and textual feature vectors of image-text descriptions for other images. In yet another example, a contrastive loss includes a cosine similarity between other image feature vectors of other images and textual feature vectors of corresponding image-text descriptions of the other images.

Additional detail will now be provided in relation to illustrative figures portraying example embodiments and implementations of an interactive image generation system. For example, FIG. 1 illustrates a computing system environment (or "environment") 100 for implementing an interactive image generation system 106 in accordance with one or more embodiments. As shown in FIG. 1, the environment 100 includes server(s) 102, a client device 108, and a network 112. Each of the components of the environment 100 communicate (or are at least configured to communicate) via the network 112, and the network 112 may be any suitable network over which computing devices can communicate. Example networks are discussed in more detail below in relation to FIG. 10.

As further illustrated in FIG. 1, the environment 100 includes the server(s) 102. In some embodiments, the server(s) 102 comprises a content server and/or a data collection server. Additionally or alternatively, the server(s) 102 comprise an application server, a communication server, a web-hosting server, a social networking server, or a digital content management server.

Moreover, as shown in FIG. 1, the server(s) 102 implement a digital content management system 104. In one or more embodiments, the digital content management system 104 generates, receives, edits, manages, and/or stores digital images. For example, in some instances, the digital content management system 104 accesses a digital image and transmits the digital image to at least one of the interactive image generation system 106 or the client device 108. In other instances, the digital content management system 104 receives generated digital images based on natural language feedback (e.g., for storing in cloud storage hosted on the server(s) 102 via the network 112).

The interactive image generation system 106 can efficiently and accurately generate a digital image having one or more targeted image elements. To do so, in one or more embodiments, the interactive image generation system 106 leverages textual inputs corresponding natural language feedback from the client device 108. In particular, the interactive image generation system 106 uses the textual inputs to condition a generative neural network for generating digital images with targeted image elements from text-informed style vectors (as will be explained below in relation to subsequent figures).

As shown in FIG. 1, the environment 100 includes the client device 108. The client device 108 can include one of a variety of computing devices, including a smartphone, tablet, smart television, desktop computer, laptop computer, virtual reality device, augmented reality device, or other computing device as described in relation to FIG. 10. Although FIG. 1 illustrates a single client device 108, in some embodiments the environment 100 includes multiple client devices 108 (e.g., multiple mobile computing devices connected to each other via the network 112). Further, in some embodiments, the client device 108 receives user input (e.g., natural language commands) and provides information pertaining to accessing, viewing, modifying, generating, and/or interacting with a digital image to the server(s) 102.

Moreover, as shown, the client device 108 can include an interactive image generation client system 110. In particular embodiments, the interactive image generation client system 110 comprises a web application, a native application installed on the client device 108 (e.g., a mobile application, a desktop application, a plug-in application, etc.), or a cloud-based application where part of the functionality is performed by the server(s) 102. In some embodiments, the interactive image generation client system 110 presents or displays information to a user associated with the client device 108, including generated digital images (and modified digital images) as provided in this disclosure.

In additional or alternative embodiments, the interactive image generation client system 110 represents and/or provides the same or similar functionality as described herein in connection with the interactive image generation system 106. In some implementations, the interactive image generation client system 110 supports the interactive image generation system 106 on the server(s) 102. Indeed, in one or more embodiments, the client device 108 includes all, or a portion of, the interactive image generation system 106.

For example, in some embodiments, the server(s) 102 train one or more machine learning models described herein. The interactive image generation system 106 can provide the one or more trained machine learning models to the client device 108 for implementation. In some embodiments, the interactive image generation system 106 can also receive user interactions via the client device 108 and implement the machine learning models at the server(s) 102.

In some embodiments, though not illustrated in FIG. 1, the environment 100 has a different arrangement of components and/or has a different number or set of components altogether. For example, in certain embodiments, the client device 108 communicates directly with the server(s) 102, bypassing the network 112. As another example, the environment 100 may include a third-party server comprising a content server and/or a data collection server.

As mentioned above, the interactive image generation system 106 can more efficiently and more flexibly generate and modify digital images based on natural language feedback. For example, FIG. 2 illustrates a process flow for generating and modifying digital images in accordance with one or more such embodiments.

Figure 2:
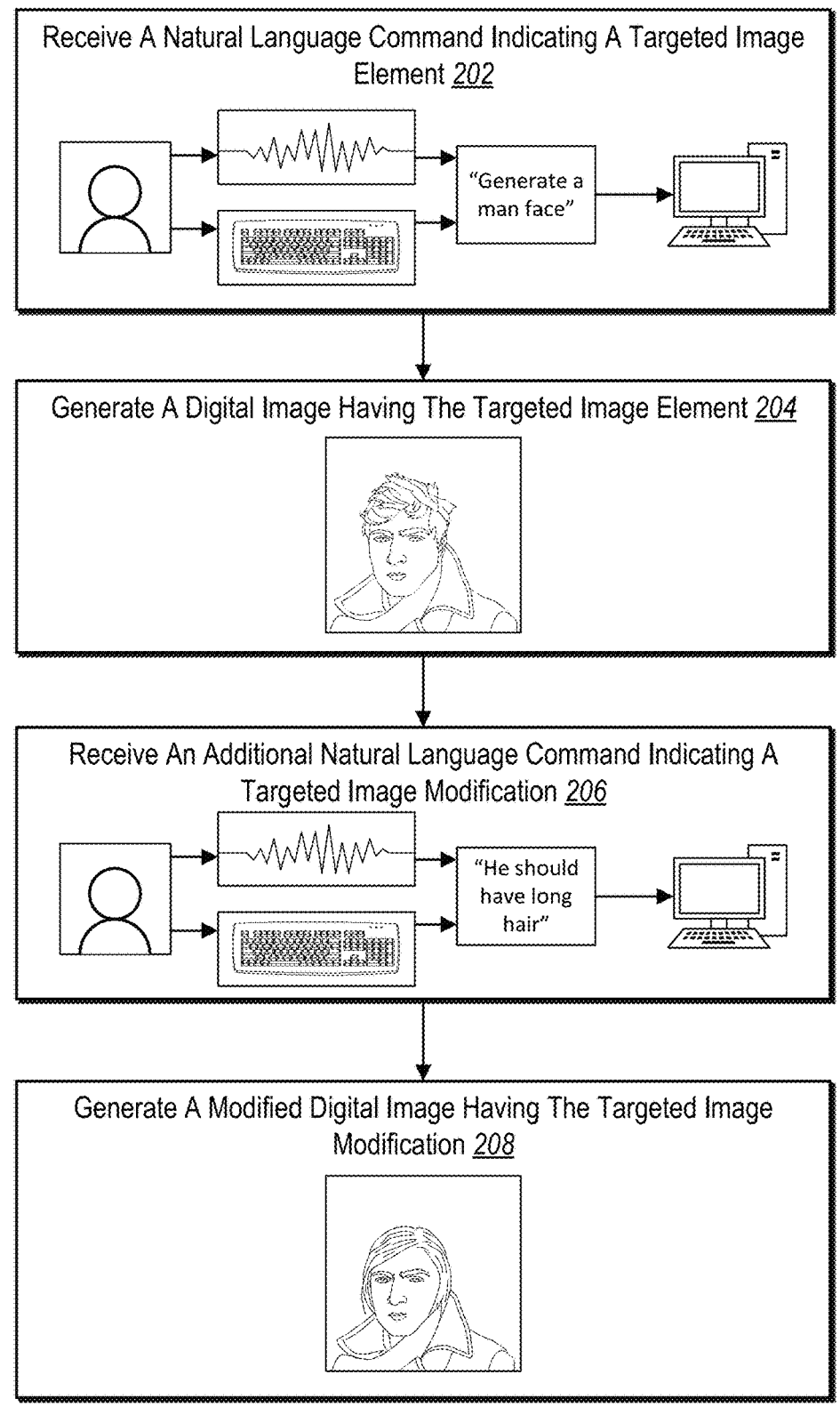
FIG. 2 illustrates a process flow for generating and modifying digital images in accordance with one or more such embodiments.

As shown in FIG. 2, at an act 202 the interactive image generation system 106 receives a natural language command indicating a targeted image element. For example, the interactive image generation system 106 receives the natural language command of "generate a man face" provided by a client device associated with a user. In certain embodiments, the interactive image generation system 106 receives audio information corresponding to the natural language command (e.g., in the form of a natural language voice request). In these or other embodiments, the interactive image generation system 106 can utilize a speech-to-text model to generate a transcription of the natural language command (e.g., a textual version of audio data). As used herein, the term "speech-to-text" model refers to a computer model for transcribing speech or audio content to create a transcription. In particular embodiments, a speech-to-text model includes automatic or machine-learning speech recognition systems.

Additionally or alternatively, the interactive image generation system 106 receives textual information corresponding to the natural language command. For example, the interactive image generation system 106 can receive a digital message, keyboard input, or user interface input that indicates the targeted image element (e.g., "a man face").

At an act 204, the interactive image generation system 106 generates a digital image having the targeted image element. For example, the interactive image generation system 106 uses textual features from the natural language command to condition a generative neural network for generating a digital image that reflects the textual features extracted from the natural language command. In one or more embodiments, the interactive image generation system 106 then presents the generated digital image for display within a graphical user interface of a client device.

At an act 206, the interactive image generation system 106 receives an additional natural language command indicating a targeted image modification to the digital image generated at the act 204. For example, the interactive image generation system 106 receives the additional natural language command of "he should have long hair" to indicate the targeted image modification is longer hair length of the portrayed subject. Indeed, as just described, the interactive image generation system 106 can receive such an additional natural language command in various ways (e.g., via audio data and/or textual data).

At an act 208, the interactive image generation system 106 generates a modified digital image having the targeted image modification. In particular embodiments, the interactive image generation system 106 leverages additional textual features extracted from the additional natural language command to condition the generative neural network. Accordingly, in this example, the interactive image generation system 106 uses the generative neural network to generate a modified digital image based on the additional textual features reflecting a desired semantic change of long hair. Also shown at the act 208 in FIG. 2, the interactive image generation system 106 maintains the man face previously generated but does not introduce undesired visual changes. Thus, and as will be explained more below, the interactive image generation system 106 can intelligently generate and modify digital images based on natural language commands.

As discussed above, the interactive image generation system 106 can utilize a pre-trained text encoder for injecting textual information into a generative neural network for text-to-image generation. In addition, the interactive image generation system 106 can update well-disentangled intermediate features of the generative neural network to generate digital images with targeted image modifications. In accordance with one or more such embodiments, FIGS. 3A-3B illustrate the interactive image generation system 106 generating a digital image and a modified digital image utilizing a generative neural network and a text encoder.

Figure 3A:
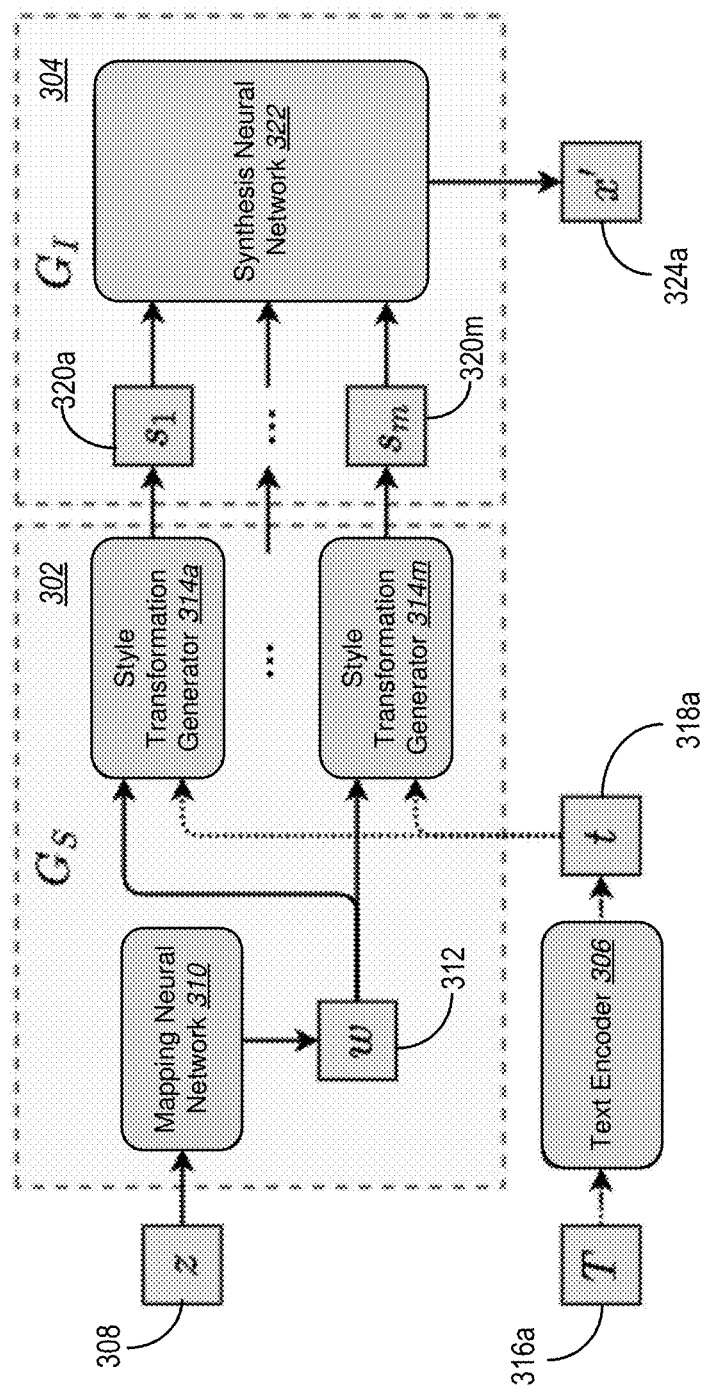
FIGS. 3A-3B illustrate an interactive image generation system generating a digital image and a modified digital image utilizing a generative neural network and a text encoder.
Figure 3B:
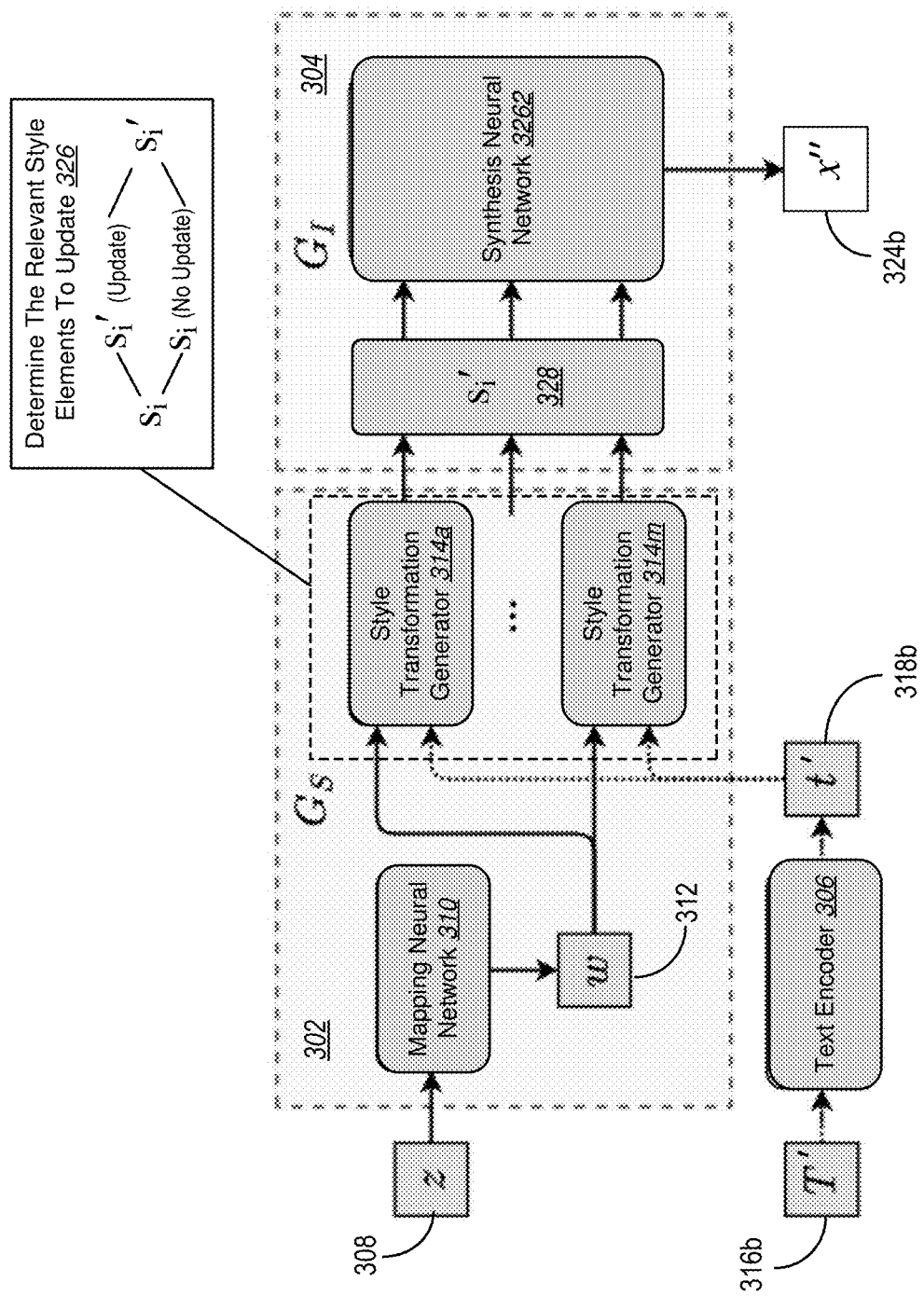

As shown in FIG. 3A, the interactive image generation system 106 uses a generative neural network comprising a style generator 302 and an image generator 304. The generative neural network generates a digital image 324a based on input noise 308 and a textual feature vector 318a.

In particular, the interactive image generation system 106 utilizes a text encoder 306 to generate the textual feature vector 318a based on a text description 316a from a natural language command indicating targeted image elements. The text encoder 306 can include a wide variety of text encoders. In particular embodiments, the text encoder 306 comprises a pre-trained text encoder trained on a rich domain of text-image pairs. For example, the text encoder 306 comprises a text encoder of the CLIP model as described in Radford et al.

In particular embodiments, the text encoder 306 generates the textual feature vector 318a by extracting textual features from the text description 316a (e.g., a text-based query or a transcription) of the natural language command. For example, the text encoder 306 generates vector representations for different semantic features of the text description 316a.

In addition to the textual feature vector 318a as input, the style generator 302 also receives the input noise 308. As used herein, the term "input noise" refers to a generative neural network input. In particular embodiments, an input noise includes a noise sampled from a Gaussian distribution or other distribution.

Based on the input noise 308, the style generator 302 utilizes a mapping neural network 310 to generate a latent noise vector 312. As used herein, the term "mapping neural network" refers to a neural network for transforming latent noise. In particular embodiments, a mapping neural network includes neural network layers for mapping latent noise to a latent space (e.g., an intermediate latent space). For example, a mapping neural network can include a series of fully connected layers as more particularly described by Karras et al., *A Style-Based Generator Architecture For Generative Adversarial Networks*, (March 2019), archived at arxiv.org/pdf/1812.04948.pdf (hereafter "Karras 2019"), the contents of which are expressly incorporated herein by reference.

The style generator 302 then utilizes style transformation generators 314a-314m to combine the latent noise vector 312 with the textual feature vector 318a. Specifically, the style transformation generators 314a-314m generate corresponding style elements 320a-320m composing a style vector $s=[s_1, s_2, \ldots, s_m]$ based on the combination of the latent noise vector 312 and the textual feature vector 318a. In one or more embodiments, the number of style elements 320a-320m depends on the desired image resolution. Additionally, the particular process (and corresponding architecture) for combining the latent noise vector 312 and the textual feature vector 318a is described more below in relation to FIGS. 4A-4B.

The image generator 304 subsequently utilizes a synthesis neural network 322 to generate the digital image 324a based on the style elements 320a-320m of a style vector. In one or more embodiments, the synthesis neural network 322 includes one or more generative neural networks for generating a digital image. In certain embodiments, the synthesis neural network 322 includes convolutional layers, adaptive instance normalization operations, etc. (e.g., as described by Karras 2019). In this manner, the synthesis neural network 322 can implement a style vector to efficiently and accurately capture the desired semantic changes in the digital image 324a.

In certain embodiments, the interactive image generation system 106 can further provide the digital image 324a for display (e.g., within a graphical user interface of a client device). For example, the interactive image generation system 106 can render the digital image 324 within a software application user interface in response to detecting a natural language command.

In FIG. 3B, the interactive image generation system 106 implements text-guided image manipulation to generate a modified digital image 324b (e.g., in an iterative process to refine the digital image 324a generated in FIG. 3B). The style generator 302 and the image generator 304 comprise the same system architecture as described above in relation to FIG. 3A. However, the following description in relation to FIG. 3B explains how the interactive image generation system 106 selectively updates or manipulates the digital image 324a while persisting the desired image elements.

As shown in FIG. 3B, the interactive image generation system 106 uses the text encoder 306 to encode an additional text description 316b corresponding to an additional natural language command indicating a targeted image modification. For example, as similarly described above, the text encoder 306 encodes the text of the additional text description 316b to generate an additional textual feature vector 318b.

The interactive image generation system 106 then uses the style transformation generators 314a-314m to generate a modified style vector 328 (e.g., s'$_i$) To do so, in one or more embodiments, the interactive image generation system 106 selectively determines which of the style elements 320a-320m of the style vector s$_i$ to update. Indeed, in one or more implementations, the interactive image generation system 106 does not change each of the style elements 320a-320m because the interactive image generation system 106 will persist desired image elements from the previously generated image (e.g., the digital image 324a), or more generally, from a user session as a whole.

In one or more embodiments, the interactive image generation system 106 performs an act 326 to determine the relevant style elements of the style elements 320a-320m of the style vector s$_i$ to update. In particular, at the act 326, the interactive image generation system 106 determines a similarity between a semantic feature change for each style element and a desired semantic change. In certain implementations, determining the similarity between the semantic feature change and the desired semantic change includes evaluating the effects of changing each style element one-by-one. Thus, the interactive image generation system 106 changes a first style vector element, determine the semantic feature change corresponding to the change, and compares the semantic feature change to the desired semantic change (e.g., from the new text command). The interactive image generation system 106 repeats this approach for the second style element and so forth. The interactive image generation system 106 can identify those style elements where the comparison satisfies a certain threshold (e.g., a similarity or difference threshold) and modify those style elements in generating a modified digital image.

For instance, let $\tilde{s}_i \in \mathbb{R}^{dim(s)}$ be a vector with value on its $i^{th}$ dimension and 0 on other dimensions (where $\tilde{s}_i$ has the same dimensionality as s). In these embodiments, the interactive image generation system 106 utilizes the following function (1) to evaluate the effects of revising the $i^{th}$ dimension (i.e., the $i^{th}$ style element):

$$\Delta r_i = \mathbb{E}_s[f_I(G_I(s+\tilde{s}_i)) - f_I(G_I(s))], s = G_S(z,t) \quad (1)$$

According to function (1), $\Delta r_i$ represents the semantic feature change of revising the $i^{th}$ dimension of the style vector s. The terms with $G_I(\ )$ represent image outputs of the image generator 304 given one or more style vector inputs (e.g., with modifications). In addition, the terms with $f_I(\ )$ represent image encodings from an image encoder (e.g., an image encoder of the CLIP model as described in Radford et al.).

After obtaining $\Delta r_i$ for all dimensions/elements, the interactive image generation system 106 selects the relevant dimensions as the dimensions (or style elements) which satisfy a threshold. In particular embodiments, the interactive image generation system 106 selects a subset of the style elements 320a-320m which satisfy function (2) below:

$$\cos(\Delta t, \Delta r_i) \geq a \quad (2)$$

According to function (2), the interactive image generation system 106 selects the style elements with $\Delta r_i$ that have a cosine similarity to a desired semantic change $\Delta t$ that is greater than or equal to a threshold similarity value a (e.g., where a>0).

The interactive image generation system 106 can utilize a variety of approaches to determining the desired semantic change $\Delta t$. For instance, the interactive image generation system 106 can determine the desired semantic change $\Delta t$ by comparing the additional textual feature vector 318b from the additional natural language command and a prior textual feature vector (e.g., the textual feature vector 318a from a prior natural language command) to estimate the desired semantic change. To illustrate, let $f_T$ be the text encoder 306 (e.g., the text encoder of CLIP). Additionally, consider the additional text description 316b as corresponding to a natural language command to edit the hair color of the human face in the image. The interactive image generation system 106 can directly estimate $\Delta t$ according to $\Delta t = f_T$ ("this person should have black hair")−t, where t is the text feature of one or more previous rounds' instruction or the feature of an empty string (for the first round). Alternatively, the interactive image generation system 106 can estimate $\Delta t$ using prompts that do not necessarily stem directly from a prior natural language command (e.g., $\Delta t = f_T$ ("a face with black hair")−$f_T$ ("a face with hair")).

Upon determining the relevant style elements to update, the interactive image generation system 106 uses the style transformation generators 314a-314m to generate the modified style vector 328. In particular embodiments, the style transformation generators 314a-314m generate the modified style vector 328 by maintaining a portion of the style elements 320a-320m. These style elements correspond to the style elements which did not contribute to the semantic feature change according to functions (1) and (2) above. Additionally, the style transformation generators 314a-314m generate the modified style vector 328 by updating the values of the relevant style elements just described above.

The style transformation generators 314a-314m can update values for the relevant style elements in a variety of different ways. In certain implementations, the style transformation generators 314a-314m generate the modified style vector 328 (i.e., s'$_i$) comprising style elements according to the following function (3):

$$[s']_i = \begin{cases} [s]_i + \gamma([G_S(z, t')]_i - [s]_i) & \text{if } i \in \{c_i\}_{i=1}^k \\ [s]_i & \text{otherwise} \end{cases} \quad (3)$$

where $i \in \{c_i\}_{i=1}^k$ indicates a style element that satisfies a threshold (as discussed above). Thus, according to function (3), the relevant style elements in the modified style vector include an additional term added to a previous style element $[s]_i$. The additional term includes a step size $\gamma$ (where $\gamma > 0$, such as 1) multiplied by the difference between (i) the style generator 302 output given the input noise 308 and the additional textual feature 318*b* and (ii) the previous style element $[s]_i$. In instances when the step size $\gamma = 1$, the values for the previous style element $[s]_i$ cancel each other out. Therefore, a style transformation generator correspondingly modifies a relevant style element $[s']_i$ to equal $[G_S(z, t')]_i$, where t' represents the additional textual feature 318*b* and z represents the input noise 308.

Also according to function (3), a style transformation generator maintains a style element $[s']_i$ as equivalent to its previous corresponding value $[s]_i$ in the previous style vector. In this manner, the style transformation generators 314*a*-314*m* can selectively update the relevant style elements and maintain the irrelevant style elements to generate the modified style vector 328. Additional details of the style generator 302 generating style vectors (or modified style vectors) are covered below in relation to FIGS. 4A-4B.

The image generator 304 then uses the synthesis neural network 322 to generate the modified digital image 324*b* (denoted as x") based on the modified style vector 328 (e.g., in a same or similar manner as described above). By updating only the relevant style elements, the synthesis neural network 322 generates the modified digital image 324*b* to include the user-desired changes while persisting previous image elements and edits throughout a user session.

In certain embodiments, the interactive image generation system 106 can further provide the modified digital image 324*b* for display (e.g., within a graphical user interface of a client device). For example, the interactive image generation system 106 can update a graphical user interface to replace the digital image 324*a* with the modified digital image 324*b* in response to detecting an additional natural language command.

In one or more alternative embodiments, the interactive image generation system 106 need not determine which style elements are sufficiently relevant to update. In these embodiments, the interactive image generation system 106 directly generates a new style vector s' based on additional text feedback T' via s'=$G_S$(z, t'). In this instance, the interactive image generation system 106 does not implement functions (1)-(3). Experimental results for this embodiment are provided below in relation to Table 4, rows "TiGAN (w/out threshold)."

Although not shown, it will be appreciated that the interactive image generation system 106 can perform more than one round of text-guided image manipulation. Indeed, the interactive image generation system 106 is capable of multiple rounds of text-guided image manipulation. Thus, the interactive image generation system 106 can iteratively modify digital images by selectively updating the previous style elements of a previous style vector based on further text descriptions for subsequent natural language commands.

As discussed above, the interactive image generation system 106 can utilize style transformation generators to create style vectors, including modified style vectors. In accordance with one or more such embodiments, FIGS. 4A-4B illustrate the interactive image generation system 106 generating style vectors by combining a textual feature vector and a latent noise vector.

As shown in FIG. 4A, the interactive image generation system 106 implements a style transformation generator 400*a* to generate a style vector 412*a*. In particular, the style transformation generator 400*a* utilizes a series of fully connected layers 404*a* to transform or modify a textual feature vector 402 from a text encoder (e.g., a textual feature vector t from a CLIP text encoder). For example, the fully connected layers 404*a* apply one or more learned transformations to the textual feature vector 402. Based on the one or more learned transformations, the fully connected layers 404*a* generate a modified textual feature vector 406*a*.

Additionally shown in FIG. 4A, the style transformation generator 400*a* combines the modified textual feature vector 406*a* and a latent noise vector 408 to generate the style vector 412*a*. In particular, the style transformation generator 400*a* combines the modified textual feature vector 406*a* and the latent noise vector 408 via a concatenation operation 410. It will be appreciated, however, that the style transformation generator 400*a* can implement additional or alternative operations (e.g., addition, multiplication, etc.). Although not illustrated, the style transformation generator 400*a* can include additional neural network layers (with learned parameter/function, $\pi_i$) to process the concatenation and generate the style vector 412*a*.

In particular embodiments, the following function (4) represents the foregoing components and operations of the style transformation generator 400*a*:

$$S_i = \pi_i([\kappa_i(t), w]) \quad (4)$$

where $\pi_i$ and $\kappa_i$ denote different learnable functions constructed using 2-layer neural networks (e.g., fully connected layers such as the fully connected layers 404*a*) and [,] denotes vector concatenation. In addition, the term t represents the textual feature vector 402, the term w represents the latent noise vector 408, and the term $S_i$ represents the style vector 412*a*.

FIG. 4B illustrates the interactive image generation system 106 implementing a style transformation generator 400*b* to generate a style vector 412*b*. In particular, the style transformation generator 400*b* utilizes a series of fully connected layers 404*b* to transform or modify the textual feature vector 402 from a text encoder. For example, the fully connected layers 404*b* apply one or more learned transformations to the textual feature vector 402. Based on the one or more learned transformations, the fully connected layers 404*b* generate a first modified textual feature vector 406*b*.

Similarly, the style transformation generator 400*b* utilizes a series of fully connected layers 404*c* to transform or modify the textual feature vector 402. For example, the fully connected layers 404*c* apply one or more learned transformations to the textual feature vector 402. The one or more learned transformations can be the same or different to those described above in relation to the fully connected layers 404*b*. Based on the one or more learned transformations, the fully connected layers 404*c* generate a second modified textual feature vector 406*c*.

Further shown in FIG. 4B, the style transformation generator 400b utilizes an affine transformer 414 to generate a transformed latent noise vector 416. In particular embodiments, the affine transformer 414 performs affine transformations with respect to the latent noise vector 408. For example, the affine transformer 414 generates the transformed latent noise vector 416 by using or more affine transform neural network layers that perform learned affine transformation(s) upon the latent noise vector 408.

The style transformation generator 400b subsequently combines the transformed latent noise vector 416 and the second modified textual feature vector 406c. In particular embodiments, the style transformation generator 400b performs a multiplication operation 418 to generate a text-informed latent noise vector 420. For example, the style transformation generator 400b generates the text-informed latent noise vector 420 by performing element-wise multiplication between the transformed latent noise vector 416 and the second modified textual feature vector 406c.

In turn, the style transformation generator 400b combines the text-informed latent noise vector 420 and the first modified textual feature vector 406b to generate the style vector 412b. For example, the style transformation generator 400b performs element-wise addition of the first modified textual feature vector 406b and the text-informed latent noise vector 420 at an addition operation 422 to generate the style vector 412b.

In particular embodiments, the following function (5) represents the foregoing components and operations of the style transformation generator 400b:

$$S_i = \emptyset_i(t) \odot \psi_i(w) + \chi_i(t) \qquad (5)$$

where $\emptyset_i$, $\psi_i$, and $\chi_i$ denote different learnable functions constructed using 2-layer neural networks (e.g., the fully connected layers 404b, 404c and the affine transformer 414). In addition, the term $S_i$ here represents the style vector 412b. The operators "$\odot$" and "+" represent element-wise multiplication and element-wise addition, respectively.

In alternative embodiments, the style transformation generators 400a-400b can similarly include additional or alternative components and/or operations than those shown and described with respect to FIGS. 4A-4B. For example, in certain implementations, the style transformation generators 400a-400b include additional (or alternative) layers to the fully connected layers. For instance, in one or more embodiments, the style transformation generators 400a-400b include different layers other than fully connected layers, such as self-attention layers. Similarly, in one or more embodiments, the style transformation generators 400a-400b include additional (or alternative) types of transformers other than affine transformers. For example, the style transformation generators 400a-400b can include non-linear transformers.

Further, it will be appreciated that the interactive image generation system 106 can implement one of the style transformation generator 400a or the style transformation generator 400b to generate style elements (e.g., the style elements 320a-320m in FIG. 3A) of a style vector. For instance, the interactive image generation system 106 can exclusively implement the style transformation generator 400a or the style transformation generator 400b to generate each style element of the style vector.

In other embodiments, the interactive image generation system 106 uses both of the style transformation generator 400a and the style transformation generator 400b to generate a style vector. For example, the interactive image generation system 106 implements the style transformation generator 400a to generate a first set (e.g., a majority) of the style elements of a style vector, and the style transformation generator 400b to generate a second set (e.g., the remainder) of style elements of the style vector. Myriad other configurations of the style transformation generators 400a, 400b are herein contemplated (e.g., alternating the style transformation generators 400a, 400b every one, two, or more dimensions or applying the style transformation generator 400b only in generating a set of style elements at the end of a style vector).

Likewise, it will be appreciated that the interactive image generation system 106 can use the style transformation generators 400a, 400b to update the relevant style elements of a style vector. For example, in text-guided image manipulation as disclosed herein, the interactive image generation system 106 can update relevant style elements of the style vector 412a or the style vector 412b based on an additional textual feature vector for another natural language command (e.g., according to function (3) described above).

Figure 5A:
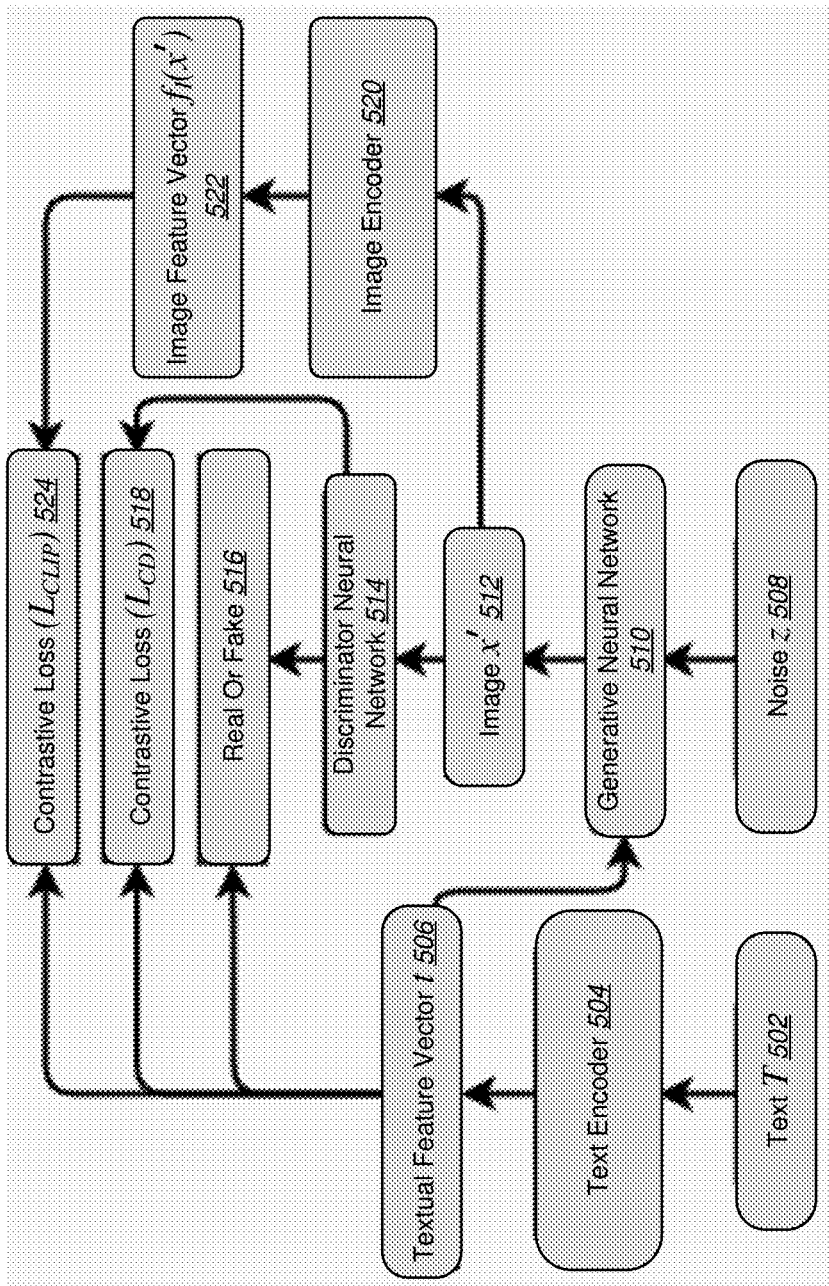
FIG. 5A illustrates an interactive image generation system training a generative neural network and a discriminator neural network in accordance with one or more embodiments.
Figure 5B:
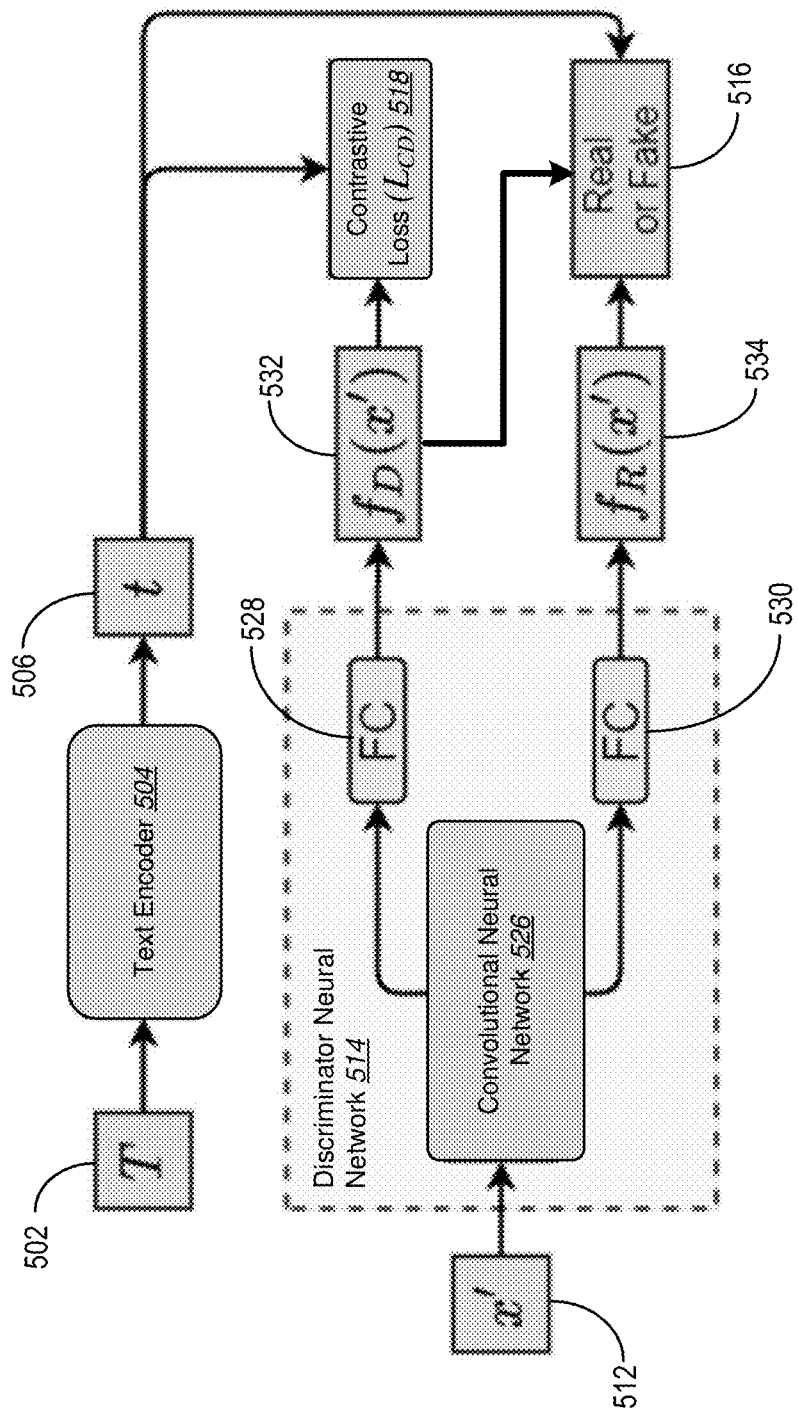
FIG. 5B illustrates an interactive image generation system training the discriminator neural network in accordance with one or more embodiments.

As discussed above, the interactive image generation system 106 can train a generative neural network and a discriminator neural network in a way that improves text-image matching. To implement this type of enhanced training, the interactive image generation system 106 uses one or more novel contrastive losses. In accordance with one or more such embodiments, FIG. 5A illustrates the interactive image generation system 106 training a generative neural network and a discriminator neural network. FIG. 5B further illustrates the interactive image generation system 106 training the discriminator neural network in accordance with one or more embodiments.

As shown in FIG. 5A, the interactive image generation system 106 provides a text description 502 for a natural language command to a text encoder 504. In one or more embodiments, the interactive image generation system 106 generates the text description 502 by identifying words from a training dataset (e.g., natural language commands, randomly selected words, auto-generated words, words from image-text pair data, etc.). In turn, the text encoder 504 (as a pre-trained model) encodes the text description 502 to generate a textual feature vector 506. The interactive image generation system 106 then conditions a generative neural network 510 with the textual feature vector 506.

Additionally shown in FIG. 5A, the interactive image generation system 106 provides an input noise 508 to the generative neural network 510. The interactive image generation system 106 generates the input noise 508 as described above (e.g., by noise sampling from a Gaussian distribution or other distribution).

The generative neural network 510 subsequently generates a digital image 512 based on the input noise 508 and the textual feature vector 506 (e.g., as described above in relation to the foregoing figures). In turn, the interactive image generation system 106 provides the digital image 512 across dual network branches. Specifically, the interactive image generation system 106 provides the digital image 512 across a first network branch to a discriminator neural network 514 for generating an authenticity classification 516 and a contrastive loss 518. This first branch is described more below in relation to FIG. 5B.

In addition, the interactive image generation system 106 provides the digital image 512 across a second network branch to an image encoder 520. In particular, the image encoder 520 generates an image feature vector 522 based on the digital image 512.

Like the text encoder 504, the image encoder 520 is also trained encoder configured to generate image feature vectors (e.g., image encodings or feature embeddings representing visual features of a digital image). In certain implementations, the image encoder 520 comprises an image encoder part of a multi-modal model (e.g., the CLIP model pretrained on 400 million text-image pairs). In other implementations, the image encoder 520 comprises a visual geometry group (VGG) convolutional neural network trained to generate image feature vectors of digital images.

The interactive image generation system 106 then uses the image feature vector 522 and the textual feature vector 506 to generate a contrastive loss 524 for the generative neural network 510. The interactive image generation system 106 utilizes one or more different approaches for generating the contrastive loss 524. In particular embodiments, the interactive image generation system 106 generates the contrastive loss 524 by using the textual feature vector 506 and the image feature vector 522 to generate loss terms that encourage the generative neural network 510 to generate images that have high semantic similarity with a corresponding text description. Additionally or alternatively, the interactive image generation system 106 generates the contrastive loss 524 with one or more terms that encourage the generative neural network 510 to generate images that have low semantic similarity with the text descriptions of other images (e.g., negative images that do not align with the text).

To illustrate, in one or more embodiments, the interactive image generation system 106 uses the following function (6) to represent the contrastive loss 524:

$$\mathcal{L}_{CLIP}(\{x'_i\}_{i=1}^n, \{T_i\}_{i=1}^n) = -\lambda \sum_{i=1}^n \log \frac{\exp(\tau\cos(f_I(x'_i), t_i))}{\sum_{j=1}^m \exp(\tau\cos(f_I(x'_i), t_j))} - $$

$$(1-\lambda) \sum_{j=1}^n \log \frac{\exp(\tau\cos(f_I(x'_j), t_j))}{\sum_{j=1}^m \exp(\tau\cos(f_I(x'_i), t_j))} \quad (6)$$

where the term $\{x'_i\}_{i=1}^n$ represents the fake images generated by the generative neural network 510 and $\{T_i\}_{i=1}^n$ represents the corresponding text descriptions (e.g., the text description 502). In addition, $\cos(f_I(x'_i, t_i)$ represents the cosine similarity between the image feature vectors for generated images and the textual feature vectors. In contrast, $\cos(f_I(x'_i, t_j)$ represents the cosine similarity between the image feature vectors for generated images and other textual feature vectors for other (negative) digital images. Similarly, $\cos(f_I(x'_j, t_j)$ represents the cosine similarity between other image feature vectors for other images and other textual feature vectors for the other digital images. The terms $\lambda$ and $\tau$ are hyperparameters (e.g., $\tau=2$ and $\lambda=0$ in some embodiments). In addition, $f_I$ represents the image encoder 520. In certain embodiments, the interactive image generation system 106 minimizes function (6) to determine the contrastive loss 524 for the generative neural network 510.

The interactive image generation system 106 subsequently determines an overall generative loss for the generative neural network 510. For example, the interactive image generation system 106 determines an overall generative loss by combining the contrastive loss 524, the contrastive loss 518 (discussed below in relation to FIG. 5B), and a generator loss. In certain implementations, the interactive image generation system 106 determines such an overall generative loss $\mathcal{L}'_G$ according to function (7):

$$\mathcal{L}'_G = \mathcal{L}_G + \alpha \mathcal{L}_{CLIP}(\{x'_i\}_{i=1}^n, \{T_i\}_{i=1}^n) + \beta \mathcal{L}_{CD}(\{x'_i\}_{i=1}^n, \{T_i\}_{i=1}^n) \quad (7)$$

where $\alpha$ and $\beta$ are learning parameters (e.g., $\alpha=10$ and $\beta=10$ in some embodiments). In addition, $\mathcal{L}_{CLIP}(\{x'_i\}_{i=1}^n, \{T_i\}_{i=1}^n)$ represents the contrastive loss 524, $\mathcal{L}_{CD}(\{x'_i\}_{i=1}^n, \{T_i\}_{i=1}^n)$ represents the contrastive loss 518, and $\mathcal{L}_G$ represents a generative loss. The generative loss is represented according to function (8):

$$\mathcal{L}_G = -\mathbb{E}_{p(x')}[\log \sigma(D(x'))] \quad (8)$$

where $\sigma()$ represents the sigmoid function, and $D(x')$ represents the realness of a generated image $x'$. The term $D(x')$ is further defined below in relation to FIG. 5B.

From the overall generative loss, the interactive image generation system 106 then updates one or more learned parameters of the generative neural network 510. In certain implementations, the interactive image generation system 106 updates the one or more learned parameters of the generative neural network 510 in parallel to or in series with updating the discriminator neural network 514 based on its own corresponding discriminator loss. In other embodiments, however, the interactive image generation system 106 updates the one or more learned parameters of the generative neural network 510 after predetermined step sizes or iterations of updating the discriminator neural network 514.

Further, although not shown in the foregoing functions, it will be appreciated that the loss functions disclosed herein can include additional or alternative hyperparameters. For example, the interactive image generation system 106 implements regularizers (e.g., R1 regularization weights equal to 10) as disclosed in Karras 2019. Additionally or alternatively, the interactive image generation system 106 selects hyperparameters based on grid searching from the range [0,50].

In FIG. 5B, the discriminator neural network 514 implements a convolutional neural network 526 to process the digital image 512. In particular embodiments, the convolutional neural network 526 extracts visual features from the digital image 512 and assigns importance values (e.g., learnable weights and biases) to the extracted visual features.

Subsequently, the discriminator neural network 514 uses parallel fully connected layers 528-530 to learn various combinations of high-level features as extracted and represented by the convolutional neural network 526. For example, the fully connected layers 528 generates an extracted feature 532 for determining the contrastive loss 518.

The interactive image generation system 106 can determine the contrastive loss 518 in one or more different ways. In certain implementations, the interactive image generation system 106 determines the contrastive loss 518 based on a comparison of discriminator-extracted image features and text descriptions. For example, the interactive image generation system 106 determines the contrastive loss 518 in such a way that encourages the discriminator neural network 514 to extract semantically meaningful features aligned with input text (e.g., the text description 502).

To illustrate, the interactive image generation system 106 determines the contrastive loss 518 based on the extracted feature 532 according to function (9):

$$\mathcal{L}_{CD}(\{x_i\}_{i=1}^n, \{T_i\}_{i=1}^n) = -\lambda \sum_{i=1}^n \log \frac{\exp(\tau\cos(f_D(x_i), t_i))}{\sum_{j=1}^n \exp(\tau\cos(f_D(x_i), t_j))} - \quad (9)$$

$$(1-\lambda) \sum_{j=1}^n \log \frac{\exp(\tau\cos(f_D(x_j), t_j))}{\sum_{j=1}^n \exp(\tau\cos(f_D(x_i), t_j))}$$

where ($\{x'_i\}_{i=1}^n$, $\{T_i\}_{i=1}^n$) corresponds to a mini-batch of text-image pairs (e.g., the digital image 512 from the generative neural network 510 and the text description 502). The term $\cos(f_D(x_i), t_i)$ represents the cosine similarity between the discriminator-extracted image features for images and the corresponding textual feature vectors for the images. In contrast, $\cos(f_D(x_i), t_j)$ represents the cosine similarity between discriminator-extracted image features for a set of images (e.g., generated images) and textual feature vectors for an alternate set of digital images. Similarly, $\cos(f_D(x_j), t_j)$ represents the cosine similarity between discriminator-extracted image features for the alternate set of images and textual feature vectors for the alternate set of digital images. Other terms are defined above in relation to function (6).

The interactive image generation system 106 subsequently determines an image-text adversarial loss (e.g., an overall discriminator loss) for the discriminator neural network 514. For example, the interactive image generation system 106 determines the image-text adversarial loss by combining the contrastive loss 518 and a generator loss. In certain implementations, the interactive image generation system 106 determines such an image-text adversarial loss $\mathcal{L}'_D$ according to function (10):

$$\mathcal{L}'_D = \mathcal{L}_D + \beta \mathcal{L}_{CD}(\{x'_i\}_{i=1}^n, \{T_i\}_{i=1}^n) \quad (10)$$

where $L_{CD}(\{x'_i\}_{i=1}^n, \{T_i\}_{i=1}^n)$ represents the contrastive loss 518 and $\mathcal{L}_D$ represents the discriminator loss. The discriminator loss is represented according to function (11):

$$\mathcal{L}_D = -\mathbb{E}_{p(x)}[\log \sigma(D(x))] - \mathbb{E}_{p(x')}[\log(1-\sigma(D(x')))] \quad (11)$$

where D (x) represents the realness of an image. Other terms in function (11) are defined above in relation to function (8).

To determine the realness of an image x (i.e., D(x)), the interactive image generation system 106 combines a predicted realness value 534 and a similarity between the semantic feature of the digital image (e.g., the extracted feature 532 from the discriminator neural network 514) and the textual feature vector 506. For example, the interactive image generation system 106 determines D(x) according to function (12):

$$D(x) = f_R(x) + \langle f_D(x), t \rangle \quad (12)$$

where $f_R(x)$ represents the predicted realness value 534 and $\langle f_D(x), t \rangle$ represents the similarity (e.g., the cosine similarity) between the extracted feature 532 from the discriminator neural network 514 and the textual feature vector 506.

Additionally shown, the fully connected layers 530 generates the predicted realness value 534 for generating the authenticity classification 516. As used herein, the term "predicted realness value" refers to a scalar value that indicates the unconditional realness of an image. For example, as a predicted realness value increases, the more likely a discriminator neural network will classify an image as real.

In particular embodiments, the discriminator neural network 514 generates the authenticity classification 516 comprising a "real" classification (e.g., authentic) or "fake" classification (e.g., not authentic or generated) for the digital image 512 based on the predicted realness value 534, the extracted feature 532, and the textual feature vector 506. Specifically, the discriminator neural network 514 generates the authenticity classification 516 with a value of "real" (or other value indicative of "real") when the discriminator neural network 514 determines an image has both large unconditional realness and a high similarity with the textual feature vector 506 for the text description 502. That is, the discriminator neural network 514 generates the authenticity classification 516 according to function (12) described above. For example, the discriminator neural network 514 generates a "real" classification for the digital image 512 when D (x') satisfies a threshold value.

With the determined terms for the image-text adversarial loss $\mathcal{L}'_D$, the interactive image generation system 106 subsequently updates one or more learned parameters of the discriminator neural network 514. For example, the interactive image generation system 106 updates one or more parameters of the discriminator neural network 514 based on the image-text adversarial loss such that the discriminator neural network 514 better extracts more semantically meaningful features aligned with text descriptions in subsequent training iterations.

It will be appreciated that the various losses—including the contrastive loss 518 and the contrastive loss 524—can impact the accuracy of the generative neural network 510 and the discriminator neural network 514. Experimental results in Table 1 evidence this impact.

TABLE 1

| Ablation Study | | |
|---|---|---|
| Method | IS↑ | FID↓ |
| TiGAN w/o$\mathcal{L}_{CLIP}$ | 22.87 | 19.62 |
| TiGAN w/o$\mathcal{L}_{CD}$ | 27.21 | 18.21 |
| TiGAN | 31.95 | 8.90 |

As shown in Table 1, experimenters observed that excluding either $L_{CLIP}$ or $L_{CD}$ leads to performance degeneration measured by FID (Frechet Inception Distance) and IS (Inception Score) metrics. FID indicates a measure of quality, and IS indicates a measure of diversity. In addition, experimenters observed that $L_{CLIP}$ appears to contribute more than $L_CD$ because the model trained without $L_{CLIP}$ in this experiment has poorer diversity according to IS.

Figure 6:
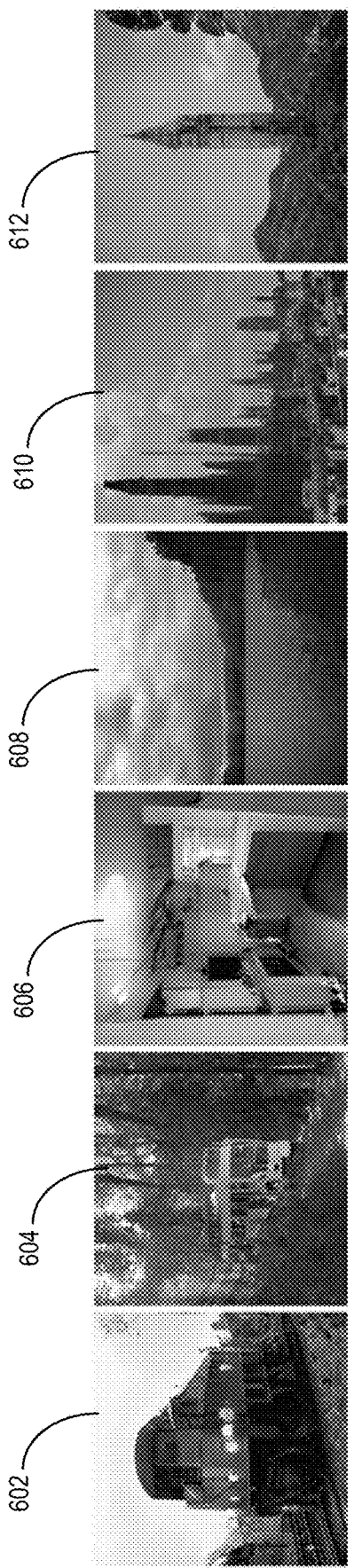
FIG. 6 illustrates experimental results of implementing an interactive image generation system in accordance with one or more embodiments.

As discussed above, the interactive image generation system 106 can accurately perform text-to-image generation. FIG. 6 illustrates experimental results of implementing the interactive image generation system 106 in accordance with one or more embodiments. As shown in FIG. 6, the interactive image generation system 106 generated images 602-604 portraying a green train coming down the track, a yellow bus in a forest, a small kitchen with a low ceiling, a peaceful lake in a cloudy day, a skyline of a modern city, and a tower on a mountain.

To generate the images 602-612, experimenters trained the generative neural network and the discriminator neural network using the MS-COCO 2014 dataset comprising complex scenes and many kinds of objects commonly used in text-to-image generation tasks. Table 2 below provides experimental results of the interactive image generation system 106 (denoted as "TiGAN") generating the images 602-612 (and others not shown). Table 2 also provides a comparison to conventional image systems (denoted with an asterisk "*").

TABLE 2

| Method | IS↑ | FID↓ |
| --- | --- | --- |
| *AttnGAN | 23.61 | 33.10 |
| *Obj-GAN | 24.09 | 36.52 |
| *DM-GAN | 32.32 | 27.23 |
| *OP-GAN | 27.88 | 24.70 |
| *XMC-GAN | 30.45 | 9.33 |
| TiGAN | 31.95 | 8.90 |

As shown in Table 2, the interactive image generation system 106 outperforms conventional image systems with respect to IS and FID. To generate the metrics in Table 2, experimenters used 30,000 generated images with randomly sampled text.

In addition, the interactive image generation system 106 includes less parameters and a smaller model size, particularly in view of the XMC-GAN model that includes many attention models. Implementing computing devices of the interactive image generation system 106 can therefore use comparatively less computer resources and improve runtime speeds for generating a digital image (e.g., at implementation and/or at training).

Experimenters conducted further text-to-image testing with respect to conventional image systems. In particular, experimenters generated the results of Table 3 below by reporting the results of conventional image systems (denoted with an asterisk "*") in Xia et al. (2021) together with results from fine-tuning the generator on Multi-modal CelebA-HQ image dataset. Additionally, experimenters generated the values of Table 3 below by generating 6,000 images using the descriptions from the CelebA-HQ image dataset. As shown in Table 3, the interactive image generation system 106 outperforms conventional image systems. Moreover, with fine-tuning, Table 3 indicates that the interactive image generation system 106 directly outperforms the conventional image system TediGAN with respect to both IS and FID.

TABLE 3

| Method | IS↑ | FID↓ |
| --- | --- | --- |
| w/o fine-tuning (Xia et al. 2021) | | |
| *AttnGAN | — | 125.98 |
| *ControlGAN | — | 116.32 |
| *DFGAN | — | 137.60 |
| *DMGAN | — | 131.05 |
| *TediGAN | — | 106.57 |
| with fine-tuning | | |
| *TediGAN + fine-tuning | 2.29 | 27.39 |
| TiGAN | 2.85 | 11.35 |

Figure 7:
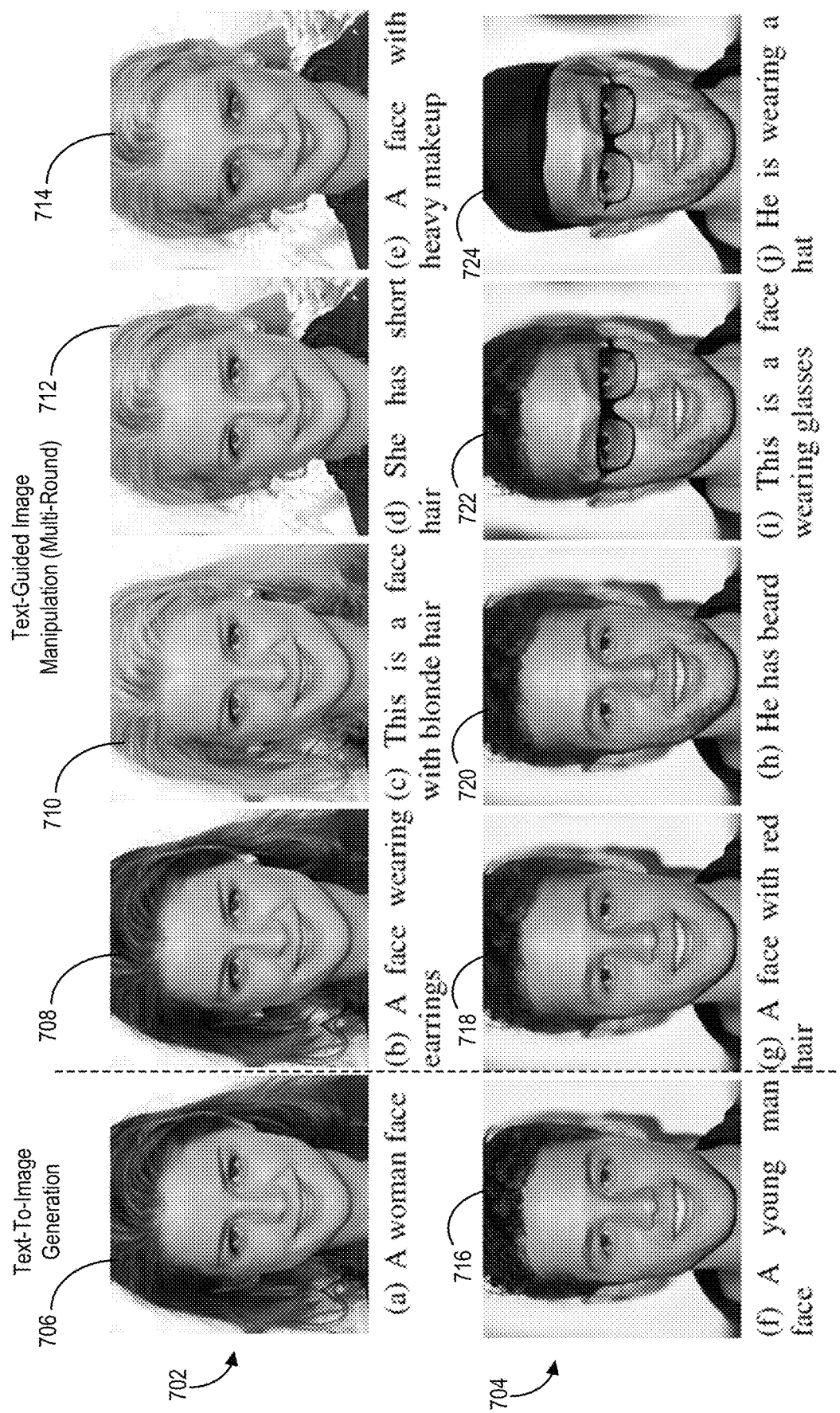
FIG. 7 illustrates additional experimental results of implementing an interactive image generation system in accordance with one or more embodiments.

As discussed above, the interactive image generation system 106 can also accurately generate digital images in multi-round text-guided image manipulation. FIG. 7 illustrates experimental results of implementing the interactive image generation system 106 in accordance with one or more such embodiments. As shown in FIG. 7, the interactive image generation system 106 can perform both text-to-image generation and text-guided image manipulation over multiple iteration rounds. In particular, the interactive image generation system 106 generates a row of images 702 by performing text-to-image generation for image 706 and then text-guided image manipulation for images 708-714. Specifically, in images 706-714, the interactive image generation system 106 generates digital images based on natural language commands indicating a woman face, a face wearing earrings, a face with blond hair, short hair, and a face with heavy makeup.

Similarly, FIG. 7 shows the interactive image generation system 106 generates a row of images 704 by performing text-to-image generation for image 716 and then text-guided image manipulation for images 718-724. Specifically, in images 716-724, the interactive image generation system 106 generates digital images based on natural language commands indicating a young man face, a face with red hair, a bearded face, wearing glasses, and wearing a hat.

In FIG. 7, the row of images 702 and the row of images 704 correspond to discrete user sessions. In addition, each subsequent image in the respective rows of images 702, 704 corresponds to an image result of a one-round interaction. The captions for the images also indicate the natural language commands from the user. As shown, the interactive image generation system 106 can manipulate the images correctly and maintain the manipulated attributes during the whole user session.

To generate the images in the experimental results of FIG. 7, experimenters used the UT Zappos 50k and Multi-modal CelebA-HQ image datasets. In addition, experimenters evaluated the quantitative results of implementing the interactive image generation system 106. To this end, experimenters designed a user simulator to give text feedback based on the generated images. The user simulator can provide text feedback that identifies one or more target attributes not satisfied by the generated image. Experimenters then designed the text feedback to feed back into the interactive image generation system 106 for further image manipulation. The interaction process stops when the user simulator finds the generated image matches all the target attributes. Experimenters used a neural network-based classifier as the user simulator for classifying the attributes of the generated images and generating text feedback based on prompt engineering.

Table 4 below provides the main results of averaging over 1000 test cases. For these results, experimenters set a threshold number of interaction rounds. Once the number of interactions met this threshold number of interactions, the user simulator identified the subject test as a failure case and started a new test case.

In particular, the results of Table 4 compare the interactive image generation system 106 with conventional image manipulation methods in StyleCLIP-Global, TediGAN and SeqAttnGAN. For fair comparison, experimenters reimplemented SeqAttnGAN using StyleGAN2 and the CLIP model, which leads to a more powerful variant. Table 4 also provides the results of implementing the interactive image generation system 106 without threshold during image manipulation. In this alternative embodiment, the interactive image generation system 106 does not use function (3). Instead, the interactive image generation system 106 directly generates a new style vector.

TABLE 4

| Method | AR(10) ↓ | SR(10) ↑ | SR(20) ↑ | SR(50) ↑ | CGAR(10) ↑ | CGAR(20) ↑ | CGAR(50) ↑ |
|---|---|---|---|---|---|---|---|
| Dataset: UT Zappos50K | | | | | | | |
| *SeqAttnGAN | 7.090 | 0.426 | 0.506 | 0.596 | 0.798 | 0.847 | 0.879 |
| *TediGAN | 7.537 | 0.419 | 0.442 | 0.492 | 0.781 | 0.802 | 0.818 |
| *StyleClip-Global | 6.954 | 0.424 | 0.462 | 0.476 | 0.757 | 0.773 | 0.790 |
| TiGAN (w/o threshold) | 6.056 | 0.628 | 0.724 | 0.818 | 0.896 | 0.922 | 0.951 |
| TiGAN | 5.412 | 0.682 | 0.784 | 0.886 | 0.896 | 0.941 | 0.970 |
| Dataset: Multi-Modal CelebA HQ | | | | | | | |
| *SeqAttnGAN | 6.284 | 0.582 | 0.728 | 0.835 | 0.878 | 0.926 | 0.944 |
| *TediGAN | 5.769 | 0.597 | 0.670 | 0.706 | 0.854 | 0.876 | 0.897 |
| *StyleClip-Global | 5.510 | 0.628 | 0.664 | 0.666 | 0.864 | 0.879 | 0.880 |
| TiGAN (w/o threshold) | 4.942 | 0.737 | 0.816 | 0.852 | 0.923 | 0.950 | 0.957 |
| TiGAN | 4.933 | 0.761 | 0.830 | 0.886 | 0.928 | 0.947 | 0.967 |

The metrics used in Table 4 are as follows. Average round (AR) is the average number of needed interactions. Success rate (SR) is defined as the ratio of number of successful cases to the number of total cases. Correctly generated attribute rate (CGAR) denotes the average percentage of correctly generated attributes in all the cases. The integer in the parenthesis denotes the threshold (e.g., max) number of interaction rounds. From the results in Table 4, experimenters observed that the interactive image generation system 106 leads to better interaction efficiency because less interaction rounds were required on average compared to conventional image systems (denoted with asterisks "*").

Experimenters also conducted human evaluation on Amazon Mechanical Turk (MTurk) for text-to-image generation, text-guided image manipulation and interactive image generation. These experimental results are shown below in Table 5. In Table 5, single-round interactions correspond to the columns of "text-to-image generation" and "text-guided manipulation." In contrast, multi-round interactions correspond to the columns of "interactive generation."

In the MTurk evaluation, the workers were provided 100 images from each method, which are generated or manipulated according to randomly sampled texts. The workers were asked to judge whether the generated or manipulated images match the text and how realistic the images are. Furthermore, the workers are also asked to judge whether the consistency is well maintained in manipulation, in the sense that there are no undesirable changes observed. The three metrics are denoted as Match, Realistic and Consistency respectively. For each metric, the workers are asked to score the images across a scale of 1 to 5, where 5 denotes the most realistic/best matching/most consistent. As shown in Table 5, the interactive image generation system 106 outperformed conventional image systems (denoted with asterisks "*") in nearly every metric category for both image datasets.

TABLE 5

| Method | Text-to-Image Generation | | Text-Guided Manipulation | | | Interactive Generation | |
|---|---|---|---|---|---|---|---|
| | Realistic ↑ | Match ↑ | Realistic ↑ | Match ↑ | Consistency ↑ | Realistic ↑ | Match ↑ |
| Dataset: UT Zappos50K | | | | | | | |
| *SeqAttnGAN | 3.66 | 3.82 | 3.88 | 2.86 | 2.64 | 3.46 | 2.78 |
| *TediGAN | 3.91 | 2.31 | 3.50 | 3.04 | 2.95 | 3.66 | 2.60 |
| *StyleClip-Global | — | — | 3.28 | 2.30 | 2.93 | 3.84 | 2.28 |
| TiGAN | 4.12 | 4.11 | 4.10 | 3.64 | 2.98 | 4.18 | 2.98 |
| Dataset: Multi-Modal CelebA HQ | | | | | | | |
| *SeqAttnGAN | 3.10 | 3.59 | 3.74 | 3.58 | 3.26 | 2.92 | 2.34 |
| *TediGAN | 3.19 | 2.49 | 4.50 | 2.92 | 2.62 | 3.86 | 2.62 |
| *StyleClip-Global | — | — | 4.14 | 3.60 | 3.42 | 2.84 | 2.36 |
| TiGAN | 3.27 | 4.09 | 4.36 | 3.68 | 3.72 | 4.00 | 2.76 |

Figure 8:
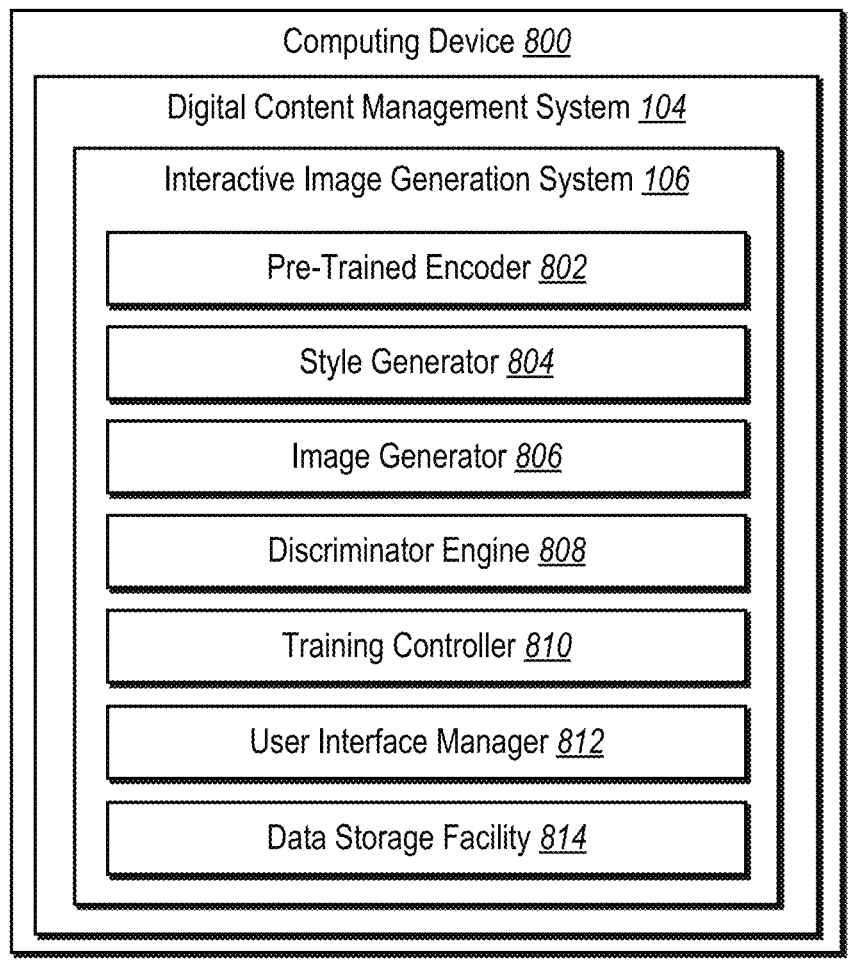
FIG. 8 illustrates a schematic diagram of a computing device implementing an interactive image generation system in accordance with one or more embodiments.

Turning to FIG. 8, additional detail will now be provided regarding various components and capabilities of the interactive image generation system 106. In particular, FIG. 8 illustrates an example schematic diagram of a computing device 800 (e.g., the server(s) 102 and/or the client device 108) implementing the interactive image generation system 106 in accordance with one or more embodiments of the present disclosure. As shown, the interactive image generation system 106 is implemented by the digital content management system 104. Also illustrated, the interactive image generation system 106 includes a pre-trained encoder 802, a style generator 804, an image generator 806, a discriminator engine 808, a training controller 810, a user interface manager 812, and a data storage facility 814.

The pre-trained encoder 802 can include a text encoder for generating a textual feature vector corresponding to natural language commands (as described in relation to the foregoing figures). Additionally, the pre-trained encoder 802 can include an image encoder for generating image feature vectors of images (as described in relation to the foregoing figures).

The style generator 804 generates style vectors (as described in relation to the foregoing figures). In particular embodiments, the style generator 804 combines a latent noise vector from input noise with a textual feature vector from the pre-trained encoder 802.

The image generator 806 generates digital images (as described in relation to the foregoing figures). In particular embodiments, the image generator 806 comprises a generative neural network that generates digital images based on style vectors (or modified style vectors).

At training, the discriminator engine 808 classifies digital images from the image generator 806 as real or fake (as described in relation to the foregoing figures). In addition, the discriminator engine 808 extracts semantic features from images (e.g., for comparing to a textual feature vector of a natural language command).

The training controller 810 generates losses for updating one or more parameters of the style generator 804, the image generator 806, and the discriminator engine 808 (as described in relation to the foregoing figures). In particular embodiments, the 810 generates contrastive losses based on textual feedback to enhance text-image matching.

In one or more embodiments, the user interface manager 812 provides, manages, and/or controls a graphical user interface (or simply "user interface"). In particular embodiments, the user interface manager 812 generates and displays a user interface by way of a display screen composed of a plurality of graphical components, objects, and/or elements that allow a user to perform a function. For example, the user interface manager 812 receives user inputs from a user, such as a click/tap to provide a natural language command in relation to a digital image. Additionally, in one or more embodiments, the user interface manager 812 presents a variety of types of information, including text, rendered digital images, or other information for presentation in a user interface.

The data storage facility 814 maintains data for the interactive image generation system 106. The data storage facility 814 (e.g., via one or more memory devices) maintains data of any type, size, or kind, as necessary to perform the functions of the interactive image generation system 106. For example, the data storage facility 814 stores digital images (e.g., for user editing). As another example, the data storage facility 814 stores a mapping neural network, a text encoder, a style transformation generator, a generative neural network, a discriminator, etc.

Each of the components of the computing device 800 can include software, hardware, or both. For example, the components of the computing device 800 can include one or more instructions stored on a computer-readable storage medium and executable by processors of one or more computing devices, such as a client device or server device. When executed by the one or more processors, the computer-executable instructions of the interactive image generation system 106 can cause the computing device(s) (e.g., the computing device 800) to perform the methods described herein. Alternatively, the components of the computing device 800 can include hardware, such as a special-purpose processing device to perform a certain function or group of functions. Alternatively, the components of the computing device 800 can include a combination of computer-executable instructions and hardware.

Furthermore, the components of the computing device 800 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 800 may be implemented as a stand-alone application, such as a desktop or mobile application. Furthermore, the components of the computing device 800 may be implemented as one or more web-based applications hosted on a remote server.

The components of the computing device 800 may also be implemented in a suite of mobile device applications or "apps." To illustrate, the components of the computing device 800 may be implemented in an application, including but not limited to, ADOBE® XD, ADOBE® STOCK, PHOTOSHOP® CAMERA, LIGHTROOM®, PHOTOSHOP® EXPRESS, PHOTOSHOP® ELEMENTS, etc. Product names, including "ADOBE" and any other portion of one or more of the foregoing product names, may include registered trademarks or trademarks of Adobe Inc. in the United States and/or other countries.

Figure 9:
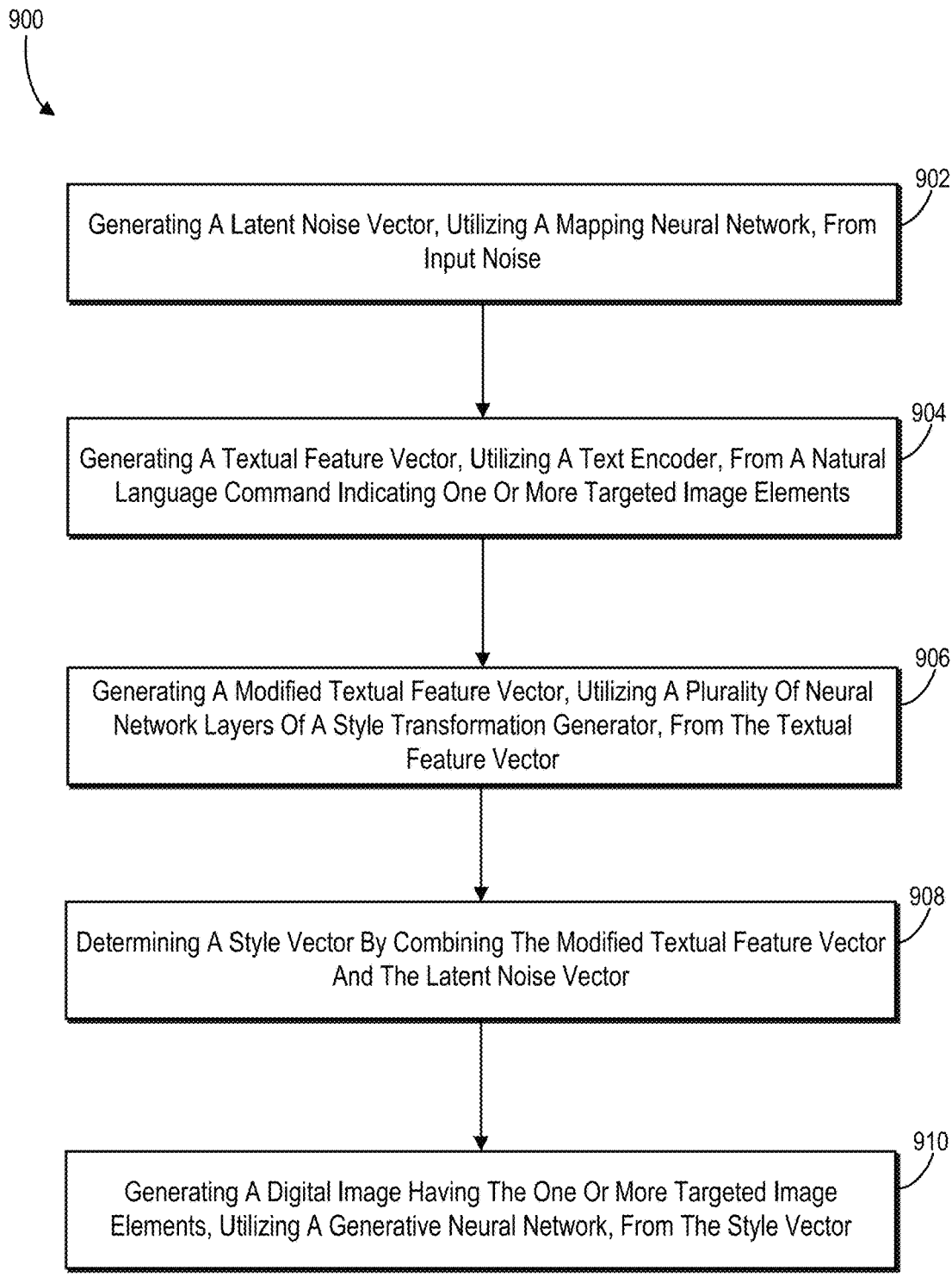
FIG. 9 illustrates a flowchart of a series of acts for generating a digital image in accordance with one or more embodiments.

FIGS. 1-8, the corresponding text, and the examples provide several different systems, methods, techniques, components, and/or devices of the interactive image generation system 106 in accordance with one or more embodiments. In addition to the above description, one or more embodiments can also be described in terms of flowcharts including acts for accomplishing a particular result. For example, FIG. 9 illustrates a flowchart of a series of acts 900 for generating a digital image in accordance with one or more embodiments. The interactive image generation system 106 may perform one or more acts of the series of acts 900 in addition to or alternatively to one or more acts described in conjunction with other figures. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As shown, the series of acts 900 includes an act 902 of generating a latent noise vector, utilizing a mapping neural network, from input noise. The series of acts 900 also includes an act 904 of generating a textual feature vector, utilizing a text encoder, from a natural language command indicating one or more targeted image elements.

In addition, the series of acts 900 includes an act 906 of generating a modified textual feature vector, utilizing a plurality of neural network layers of a style transformation generator, from the textual feature vector. Further, the series of acts 900 includes an act 908 of determining a style vector by combining the modified textual feature vector and the latent noise vector. The series of acts 900 additionally includes an act 910 of generating a digital image having the one or more targeted image elements, utilizing a generative neural network, from the style vector.

It is understood that the outlined acts in the series of acts 900 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 9, act(s) in the series of acts 900 may include an act of: generating a transformed latent noise vector from the latent noise vector utilizing a transformer; and generating, utilizing a first set of neural network layers, a first modified textual feature vector from the textual feature vector encoding the natural language command.

As another example of an additional act not shown in FIG. 9, act(s) in the series of acts 900 may include an act of: determining a text-informed latent noise vector by combining the first modified textual feature vector and the transformed latent noise vector; generating a second modified textual feature vector from the textual feature vector utilizing a second set of neural network layers; and generating the style vector for creating the digital image by combining the text-informed latent noise vector and the second modified textual feature vector.

As a further example of an additional act not shown in FIG. 9, act(s) in the series of acts 900 may include an act of: generating, using a speech-to-text model, a transcription of the natural language command comprising an arbitrary voice request indicating the one or more targeted image elements; and generating, utilizing the text encoder, the textual feature vector by encoding the transcription.

In still another example of an additional act not shown in FIG. 9, act(s) in the series of acts 900 may include an act of: receiving an additional natural language command indicating one or more targeted image modifications to the digital image; and generating, utilizing the text encoder, an additional textual feature vector from the additional natural language command.

Additionally, another example of an additional act not shown in FIG. 9 includes act(s) in the series of acts 900 of: generating a modified style vector by determining a set of elements of the style vector to modify based on the additional textual feature vector; and generating, utilizing a generative neural network, a modified digital image with the one or more targeted image elements and the one or more targeted image modifications according to the modified style vector.

In another example of an additional act not shown in FIG. 9, act(s) in the series of acts 900 may include an act of: receiving a natural language command indicating one or more targeted image modifications for a digital image previously generated utilizing a style vector; generating, utilizing a text encoder, an additional textual feature vector from the natural language command; generating a modified style vector by determining a set of elements of the style vector to modify based on the additional textual feature vector; and generating, utilizing a generative neural network, a modified digital image with the one or more targeted image modifications according to the modified style vector.

In particular embodiments, an additional act not shown in FIG. 9 includes act(s) in the series of acts 900 of generating the modified style vector by persisting prior targeted image modifications captured in the style vector.

As another example of an additional act not shown in FIG. 9, act(s) in the series of acts 900 may include an act of determining the set of elements of the style vector to modify by determining a similarity between a semantic feature change for each style element and a desired semantic change based on the natural language command.

In yet another example of an additional act not shown in FIG. 9, act(s) in the series of acts 900 may include an act of determining the desired semantic change by utilizing a combination of the additional textual feature vector from the natural language command and a prior textual feature vector from one or more previous natural language commands in a user session to estimate the desired semantic change.

In a further example of an additional act not shown in FIG. 9, act(s) in the series of acts 900 may include an act of generating the modified digital image by replacing, within a graphical user interface on a client device, a previous digital image with the modified digital image in response to receiving the natural language command.

Additionally, in another example of an additional act not shown in FIG. 9, act(s) in the series of acts 900 may include an act of utilizing: a mapping neural network that generates a latent noise vector based on input noise; a text encoder that generates a textual feature vector from a natural language command indicating one or more targeted image elements; and a style transformation generator that generates a style vector by combining the latent noise vector and the textual feature vector. The act may further include generating a digital image with the one or more targeted image elements utilizing the style vector.

In yet another example of an additional act not shown in FIG. 9, act(s) in the series of acts 900 may include an act of utilizing a style transformation generator to combine the latent noise vector and the textual feature vector by performing at least one of concatenation, element-wise addition, or element-wise multiplication of the latent noise vector and the modified version of the textual feature vector. In one or more embodiments, the style transformation generator comprises a set of neural network layers that utilize learned parameters to generate a modified version of the textual feature vector.

In some embodiments, the style transformation generator in the series of acts 900 comprises: a transformer that performs one or more transformations with respect to the latent noise vector from the mapping neural network; and a first set of neural network layers that utilize a first set of learned parameters to modify the textual feature vector from the text encoder to generate a first modified textual feature vector. In particular embodiments, the style transformation generator: generates a text-informed latent noise vector by combining the latent noise vector and the first modified textual feature vector; comprises a second set of neural network layers that utilize a second set of learned parameters to modify the textual feature vector from the text encoder to generate a second modified textual feature vector; and generates the style vector by combining the second modified textual feature vector and the text-informed latent noise vector.

In some embodiments, the text encoder in the series of acts 900 is configured to receive arbitrary textual inputs via the natural language command comprising at least one of a text-based query or a transcription corresponding to a voice request.

Further, in some embodiments, the discriminator neural network in the series of acts 900 comprises: a first branch of neural network layers that generates a predicted realness value of the digital image with the one or more targeted image elements; and a second branch of neural network layers that generates a semantic feature extracted from the digital image with the one or more targeted image elements.

In a further example of an additional act not shown in FIG. 9, act(s) in the series of acts 900 may include an act of updating parameters of the discriminator neural network based on an image-text adversarial loss determined from the predicted realness value and a comparison between the semantic feature and the natural language command.

In still another example of an additional act not shown in FIG. 9, act(s) in the series of acts 900 may include an act of: determining a contrastive loss for the generative neural network by determining a similarity between the textual feature vector from the natural language command and an image encoding of the digital image; and updating one or more parameters for the generative neural network based on the contrastive loss.

In particular embodiments, an additional act not shown in FIG. 9 includes act(s) in the series of acts 900 of: determining the contrastive loss for the generative neural network by determining an additional similarity between a vector representation of a text description for one or more other images and the image encoding of the digital image; and updating one or more parameters for the generative neural network based on the contrastive loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
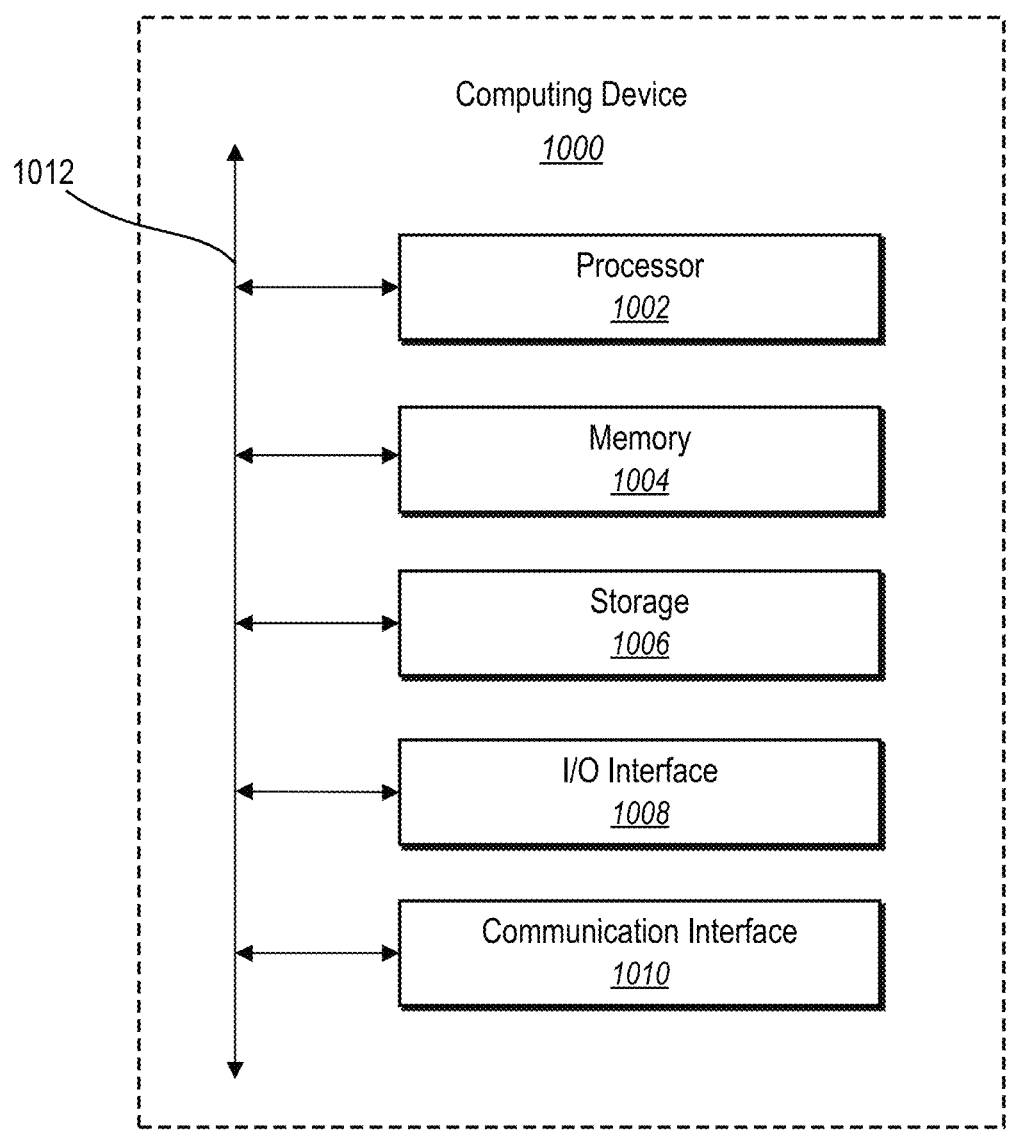
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., the server(s) 102, the client device 108, and/or the computing device 800). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of the computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium comprising instructions that, when executed by at least one processor, cause a computing device to perform operations comprising:
generating a latent noise vector, utilizing a mapping neural network, from input noise;
generating a textual feature vector, utilizing a text encoder, from a natural language command indicating one or more targeted image elements;
generating a modified textual feature vector, utilizing a plurality of neural network layers of a style transformation generator, from the textual feature vector;

determining a style vector by combining the modified textual feature vector and the latent noise vector; and generating a digital image having the one or more targeted image elements, utilizing a generative neural network, from the style vector.

2. The non-transitory computer-readable medium of claim 1, further comprising instructions that, when executed by the at least one processor, cause the computing device to perform operations comprising:

generating a transformed latent noise vector from the latent noise vector utilizing a transformer; and generating, utilizing a first set of neural network layers, a first modified textual feature vector from the textual feature vector encoding the natural language command.

3. The non-transitory computer-readable medium of claim 2, further comprising instructions that, when executed by the at least one processor, cause the computing device to perform operations comprising:

determining a text-informed latent noise vector by combining the first modified textual feature vector and the transformed latent noise vector;

generating a second modified textual feature vector from the textual feature vector utilizing a second set of neural network layers; and generating the style vector for creating the digital image by combining the text-informed latent noise vector and the second modified textual feature vector.

4. The non-transitory computer-readable medium of claim 1, further comprising instructions that, when executed by the at least one processor, cause the computing device to perform operations comprising:

generating, using a speech-to-text model, a transcription of the natural language command comprising an arbitrary voice request indicating the one or more targeted image elements; and generating, utilizing the text encoder, the textual feature vector by encoding the transcription.

5. The non-transitory computer-readable medium of claim 1, further comprising instructions that, when executed by the at least one processor, cause the computing device to perform operations comprising:

receiving an additional natural language command indicating one or more targeted image modifications to the digital image; and generating, utilizing the text encoder, an additional textual feature vector from the additional natural language command.

6. The non-transitory computer-readable medium of claim 5, further comprising instructions that, when executed by the at least one processor, cause the computing device to perform operations comprising:

generating a modified style vector by determining a set of elements of the style vector to modify based on the additional textual feature vector; and generating, utilizing a generative neural network, a modified digital image with the one or more targeted image elements and the one or more targeted image modifications according to the modified style vector.

7. A system comprising:
one or more memory devices comprising:
a mapping neural network that generates a latent noise vector based on input noise;
a text encoder that generates a textual feature vector from a natural language command indicating one or more targeted image elements; and
a style transformation generator that generates a style vector by combining the latent noise vector and the textual feature vector; and
one or more processors configured to cause the system to generate a digital image with the one or more targeted image elements utilizing the style vector.

8. The system of claim 7, wherein the style transformation generator:
comprises a set of neural network layers that utilize learned parameters to generate a modified version of the textual feature vector; and
combines the latent noise vector and the textual feature vector by performing at least one of concatenation, element-wise addition, or element-wise multiplication of the latent noise vector and the modified version of the textual feature vector.

9. The system of claim 7, wherein the style transformation generator comprises:
a transformer that performs one or more transformations with respect to the latent noise vector from the mapping neural network; and
a first set of neural network layers that utilize a first set of learned parameters to modify the textual feature vector from the text encoder to generate a first modified textual feature vector.

10. The system of claim 9, wherein the style transformation generator:
generates a text-informed latent noise vector by combining the latent noise vector and the first modified textual feature vector;
comprises a second set of neural network layers that utilize a second set of learned parameters to modify the textual feature vector from the text encoder to generate a second modified textual feature vector; and
generates the style vector by combining the second modified textual feature vector and the text-informed latent noise vector.

11. The system of claim 7, wherein the text encoder is configured to receive arbitrary textual inputs via the natural language command comprising at least one of a text-based query or a transcription corresponding to a voice request.

12. The system of claim 7, wherein the one or more memory devices comprise a discriminator neural network that comprises:
a first branch of neural network layers that generates a predicted realness value of the digital image with the one or more targeted image elements; and
a second branch of neural network layers that generates a semantic feature extracted from the digital image with the one or more targeted image elements.

13. The system of claim 12, wherein the one or more processors are further configured to cause the system to update parameters of the discriminator neural network based on an image-text adversarial loss determined from the predicted realness value and a comparison between the semantic feature and the natural language command.

14. The system of claim 7, wherein:
the one or more memory devices comprise a generative neural network; and
the one or more processors are configured to:
determine a contrastive loss for the generative neural network by determining a similarity between the textual feature vector from the natural language command and an image encoding of the digital image; and
update one or more parameters for the generative neural network based on the contrastive loss.

15. The system of claim 14, wherein the one or more processors are configured to:
- determine the contrastive loss for the generative neural network by determining an additional similarity between a vector representation of a text description for one or more other images and the image encoding of the digital image; and
- update one or more parameters for the generative neural network based on the contrastive loss.

16. A computer-implemented method comprising:
- receiving a natural language command indicating one or more targeted image modifications for a digital image previously generated utilizing a style vector;
- generating, utilizing a text encoder, an additional textual feature vector from the natural language command;
- generating a modified style vector by determining a set of elements of the style vector to modify based on the additional textual feature vector; and
- generating, utilizing a generative neural network, a modified digital image with the one or more targeted image modifications according to the modified style vector.

17. The computer-implemented method of claim 16, wherein generating the modified style vector comprises persisting prior targeted image modifications captured in the style vector.

18. The computer-implemented method of claim 16, wherein determining the set of elements of the style vector to modify comprises determining a similarity between a semantic feature change for each style element and a desired semantic change based on the natural language command.

19. The computer-implemented method of claim 18, further comprising determining the desired semantic change by utilizing a combination of the additional textual feature vector from the natural language command and a prior textual feature vector from one or more previous natural language commands in a user session to estimate the desired semantic change.

20. The computer-implemented method of claim 16, wherein generating the modified digital image comprises replacing, within a graphical user interface on a client device, a previous digital image with the modified digital image in response to receiving the natural language command.

* * * * *